United States Patent
Son et al.

(10) Patent No.: US 10,671,069 B2
(45) Date of Patent: Jun. 2, 2020

(54) DRIVING SYSTEM FOR VEHICLE AND VEHICLE THEREOF

(71) Applicant: LG Electronics Inc., Seoul (KR)

(72) Inventors: Minji Son, Seoul (KR); Eunkyung Noh, Seoul (KR); Jinhua Piao, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/856,360

(22) Filed: Dec. 28, 2017

(65) Prior Publication Data

US 2019/0011918 A1    Jan. 10, 2019

(30) Foreign Application Priority Data

Jul. 6, 2017    (KR) .................. 10-2017-0086094

(51) Int. Cl.
*G05D 1/00* (2006.01)
*G01C 21/36* (2006.01)
(Continued)

(52) U.S. Cl.
CPC .......... *G05D 1/0088* (2013.01); *B60W 50/14* (2013.01); *G01C 21/3484* (2013.01);
(Continued)

(58) Field of Classification Search
CPC .. G05D 1/0221; G05D 1/0088; G05D 1/0061; G05D 2201/0213; B60W 50/14;
(Continued)

(56) References Cited

U.S. PATENT DOCUMENTS

2007/0198144 A1*  8/2007  Norris .................. B60T 7/22
                                                                    701/23
2009/0192703 A1    7/2009  Hess et al.
(Continued)

FOREIGN PATENT DOCUMENTS

DE           10105175          8/2002
DE        102016007476         2/2017
(Continued)

OTHER PUBLICATIONS

European Search Report in European Application No. 18181932.7, dated Nov. 9, 2018, 9 pages.

*Primary Examiner* — Paula L Schneider
(74) *Attorney, Agent, or Firm* — Fish & Richardson P.C.

(57) ABSTRACT

A driving system for a vehicle includes: an input unit configured to receive user input from a user; an interface configured to acquire vehicle driving information and to acquire information from one or more devices provided in the vehicle; at least one processor; and a computer-readable medium having stored thereon instructions which, when executed by the at least one processor, causes the at least one processor to perform operations including: acquiring information from the one or more devices; determining that the vehicle is to be autonomously driven in absence of a set destination; determining at least one of a first time period or a first distance based on the acquired information; identifying a first area based on at least one of the first time period or the first distance; and providing a control signal configured to autonomously drive the vehicle within the first area.

11 Claims, 16 Drawing Sheets

(51) Int. Cl.
*B60W 50/14* (2020.01)
*G01C 21/34* (2006.01)

(52) U.S. Cl.
CPC ....... *G01C 21/362* (2013.01); *G01C 21/3617* (2013.01); *G01C 21/3679* (2013.01); *G01C 21/3691* (2013.01); *G05D 1/0061* (2013.01); *B60K 2370/115* (2019.05); *B60K 2370/175* (2019.05); *B60W 2540/04* (2013.01); *B60W 2540/24* (2013.01); *B60W 2540/26* (2013.01); *B60W 2540/28* (2013.01); *B60W 2550/402* (2013.01); *G01C 21/3476* (2013.01); *G05D 2201/0213* (2013.01)

(58) Field of Classification Search
CPC ......... B60W 2540/04; B60W 2540/24; B60W 2540/26; B60W 2540/28; B60W 2550/402; G01C 21/3484; G01C 21/3617; G01C 21/362; G01C 21/3679; G01C 21/3691; G01C 21/3476; B60K 2370/115; B60K 2370/175

USPC .......................................................... 701/25
See application file for complete search history.

(56) References Cited

U.S. PATENT DOCUMENTS

| | | |
|---|---|---|
| 2013/0110343 A1 | 5/2013 | Ichikawa et al. |
| 2014/0372025 A1 | 12/2014 | Yoshida et al. |
| 2017/0108348 A1* | 4/2017 | Hansen ................... H04W 4/44 |
| 2017/0147004 A1* | 5/2017 | Reichel ................. B60W 40/08 |
| 2018/0204468 A1* | 7/2018 | Onomura ............. G08G 5/0043 |
| 2018/0266834 A1* | 9/2018 | Cronin ............... B60H 1/00742 |
| 2018/0362158 A1* | 12/2018 | Zhang ................... B64C 39/024 |

FOREIGN PATENT DOCUMENTS

| | | |
|---|---|---|
| JP | 2009-225564 | 10/2009 |
| JP | 2012-048563 | 3/2012 |
| JP | 2017-102787 | 6/2017 |
| KR | 10-2015-0024715 | 3/2015 |
| KR | 10-2017-0002166 | 1/2017 |

* cited by examiner

DRIVING SYSTEM FOR VEHICLE AND VEHICLE THEREOF

CROSS-REFERENCE TO RELATED APPLICATION

This application claims an earlier filing date and the right of priority to Korean Patent Application No. 10-2017-0086094, filed on Jul. 6, 2017, the contents of which are incorporated herein by reference in its entirety.

TECHNICAL FIELD

The present disclosure relates to a driving system for vehicles and a vehicle. Specifically, the present disclosure relates to a driving system for vehicles and a vehicle which can perform autonomous driving even when a destination is not set.

BACKGROUND

A vehicle is an apparatus configured to move a user in the user's desired direction. A representative example of a vehicle may be an automobile.

Various types of sensors and electronic devices may be provided in the vehicle to enhance user convenience. For example, an Advanced Driver Assistance System (ADAS) is being actively developed for enhancing the user's driving convenience and safety. In addition, autonomous vehicles are being actively developed.

SUMMARY

In one aspect, a driving system for a vehicle, includes: an input unit configured to receive user input from a user; an interface configured to acquire vehicle driving information and to acquire information from one or more devices provided in the vehicle; at least one processor; and a computer-readable medium coupled to the at least one processor having stored thereon instructions which, when executed by the at least one processor, causes the at least one processor to perform operations including: acquiring, through the interface, information from the one or more devices provided in the vehicle; based on at least one of the acquired information from the one or more devices provided in the vehicle or the user input, determining that the vehicle is to be autonomously driven in absence of a set destination; based on the determination that the vehicle is to be autonomously driven in absence of a set destination, determining at least one of a first time period or a first distance based on the acquired information; identifying a first area based on at least one of the first time period or the first distance; and providing, through the interface, a control signal to a vehicle drive device, the control signal configured to autonomously drive the vehicle within the first area.

Implementations may include one or more of the following features. For example, determining that the vehicle is to be autonomously driven in absence of a set destination includes: receiving a first user input requesting autonomous driving of the vehicle; based on receipt of the user input requesting autonomous driving of the vehicle, displaying, through a display of the vehicle, a screen configured to receive an input of the destination of the vehicle; determining that (i) the input of the destination has not been received after a predetermined period, or (ii) a second user input requesting autonomous driving of the vehicle has been received; and based on the determination that (i) the input of the destination has not been received after a predetermined period, or (ii) a second user input requesting autonomous driving of the vehicle has been received, determining that the vehicle is to be autonomously driven in absence of a set destination.

In some implementations, determining that the vehicle is to be autonomously driven in absence of a set destination includes: determining, based on the acquired information, that (i) the vehicle is in a driving scenario in which the vehicle is not allowed to stop, and (ii) a passenger is not manually driving the vehicle; and based on the determination that (i) the vehicle is in a driving scenario in which the vehicle is not allowed to stop, and (ii) a passenger is not manually driving the vehicle, determining that the vehicle is to be autonomously driven in absence of a set destination.

In some implementations, determining at least one of the first time period or the first distance based on the acquired information includes: acquiring, through the interface, the information from the one or more devices provided in the vehicle by acquiring schedule information and vehicle position information; and determining the at least one of the first time period or the first distance based on the acquired schedule information and the vehicle position information, the at least one of the first time period or the first distance determined based on the vehicle driving to an appointment location by an appointment time indicated in the schedule information.

In some implementations, determining at least one of the first time period or the first distance based on the acquired information includes: acquiring, through the interface, at least one of energy information or traffic information; and determining the at least one of the first time period or the first distance based on the at least one of the energy information or the traffic information.

In some implementations, identifying a first area based on at least one of the first time period or the first distance includes: identifying the first area as an area, anywhere from which the vehicle can return to an autonomous driving starting location within the first time period; or identifying the first area as an area centered around an autonomous driving starting location and having a boundary defined by the first distance from the autonomous driving starting location.

In some implementations, the operations include: acquiring, through the interface, points of interest (POIs) information; and determining, based on the POIs information and the vehicle driving information, one or more recommended POIs corresponding to a driving situation of the vehicle and located within the first area, and providing the control signal to the vehicle drive device includes: providing a control signal configured to autonomously drive the vehicle through the one or more recommended POIs located within the first area.

In some implementations, the operations include: displaying, through a display of the vehicle, a screen configured to receive a user selection among the one or more recommended POIs; and setting the destination of the vehicle according to the received user selection.

In some implementations, the operations include: determining a presence of a plurality of recommended POIs located within the first area; and based on the determination of the presence of a plurality of recommended POIs located within the first area, generating an optimized path through the plurality of recommended POIs, and providing the control signal to the vehicle drive device includes: providing a control signal configured to autonomously drive the vehicle through the optimized path.

In some implementations, the operations include: determining user preference for the one or more recommended POIs based on the POIs information; and displaying, through a display of the vehicle, the user preference for the one or more recommended POIs.

In some implementations, the operations include: determining that (i) the vehicle has passed through the one or more recommended POIs located within the first area and (ii) the user has not entered a destination, and providing the control signal to the vehicle drive device further includes: based on the determination that (i) the vehicle has passed through the one or more recommended POIs located within the first area and (ii) the user has not entered a destination, providing a control signal configured to autonomously drive the vehicle to a preset return location.

In some implementations, the operations include: receiving, through the interface, a signal from a maneuvering device of the vehicle; based on the receipt of the signal from the maneuvering device, determining that the vehicle is located within a second distance from a boundary of the first area; and based on the (i) receipt of the signal from the maneuvering device, and (ii) determination that the vehicle is located within the second distance from the boundary of the first area, modifying the boundary of the first area.

In some implementations, the operations include: in a state in which the vehicle is being autonomously driven in absence of a set destination, acquiring, through the interface, a destination input from a device provided in the vehicle; and based on the acquired destination input, setting the destination according to the acquired destination input.

In another aspect, a driving system for vehicle includes: an input unit configured to receive user input from a user; an interface configured to acquire vehicle driving information and to acquire information from one or more devices provided in the vehicle; at least one processor; and a computer-readable medium coupled to the at least one processor having stored thereon instructions which, when executed by the at least one processor, causes the at least one processor to perform operations including: acquiring, through the interface, driving history data including a plurality of past destinations from the one or more devices provided in the vehicle; based on at least one of the driving history data or the user input, determining that the vehicle is to be autonomously driven in absence of a user-provided destination; based on the determination that the vehicle is to be autonomously driven in absence of a user-provided destination, identifying, from the plurality of past destinations, a destination corresponding to a driving situation of the vehicle; and providing, through the interface, a control signal to a vehicle drive device, the control signal configured to autonomously drive the vehicle to the identified destination.

Implementations may include one or more of the following features. For example, the operations include: determining the driving situation based on the vehicle driving information; determining one or more past driving situations associated with the one or more past destinations based on the driving history data; determining matching rates between the driving situation and each of the one or more past driving situations; including in one or more recommended destinations the one or more past destinations having corresponding matching rates greater than or equal to a first value; determining whether a plurality of recommended destinations has been identified; based on a determination that a plurality of recommended destinations has been identified, displaying, through a display of the vehicle, a screen configured to receive a user selection among the plurality of recommended destinations, and setting at least one destination of the vehicle according to the received user selection; and based on a determination that a single recommended destination has been identified, setting the single recommended destination as the at least one destination of the vehicle.

In some implementations, determining of the matching rates between the driving situation and each of the one or more past driving situations is based on at least one of a state of the vehicle, a passenger, a state of the passenger, a starting location, a driving time, or a driving path.

In some implementations, the operations include: acquiring, through the interface, points of interest (POIs) information; determining, based on the POIs information and the vehicle driving information, one or more recommended POIs corresponding to the driving situation of the vehicle; and displaying, through a display of the vehicle, the one or more recommended POIs.

In some implementations, determining the one or more recommended POIs corresponding to the driving situation of the vehicle includes: determining a destination type corresponding to the driving situation based on at least one of a location of the vehicle, a state of the vehicle, a passenger, a state of the passenger, or a driving time; and determining the one or more recommended POIs as one or more POIs corresponding to the destination type, and the operations include: displaying, through a display of the vehicle, a screen configured to receive a user selection among the one or more recommended POIs; and setting the destination of the vehicle according to the received user selection.

In some implementations, the operations include: determining that the vehicle is in manual driving mode; based on the determination that the vehicle is in manual driving mode, determining a current manual driving route driven by the vehicle, and identifying the destination corresponding to the driving situation of the vehicle from the plurality of past destinations includes: based on the determination that (i) that the vehicle is in manual driving mode, and (ii) the vehicle is to be autonomously driven in absence of a set destination, identifying one from the plurality of past destinations that corresponds to the current manual driving route based on the driving history data.

In some implementations, the operations include: determining that the vehicle is in manual driving mode; acquiring, through the interface, a state of a driver of the vehicle; based on the state of the driver, determining that the driver is unable to manually drive the vehicle; and based on the determination that (i) the vehicle is in manual driving mode; and (ii) the driver is unable to manually drive the vehicle, setting a location corresponding to the state of the driver as a destination of the vehicle.

In some scenarios, according to some implementations of the present disclosure, one or more of the following effects may be achieved.

First, an autonomous driving of a vehicle in absence of a set destination may be performed within a limited area until a destination is set.

Second, during the autonomous driving of the vehicle in absence of a set destination, the vehicle may travel to a various locations that may be desired by the user based on, for example, driving history data of point of interest information.

Effects of the present invention should not be limited to the aforementioned effects and other unmentioned effects will be clearly understood by those skilled in the art from the claims. The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

For autonomous driving of a vehicle, an autonomous driving route is typically generated based on a set destination of the vehicle. As such, an autonomous vehicle may not be able to perform autonomous driving in absence of a set destination. However, there may be various driving situations where autonomous driving of the vehicle even in absence of a set destination may be desired, for example, for a user's convenience or safety. As such, a driving system for vehicles that can autonomously drive the vehicle without a set destination may be desired.

A vehicle according to an implementation of the present disclosure may include, for example, a car or a motorcycles or any suitable motorized vehicle. Hereinafter, the vehicle will be described based on a car.

The vehicle according to the implementation of the present disclosure may be powered by any suitable power source, and may be an internal combustion engine car having an engine as a power source, a hybrid vehicle having an engine and an electric motor as power sources, or an electric vehicle having an electric motor as a power source.

The left side of a vehicle refers to the left side of a traveling direction of the vehicle and the right side of the vehicle refers to the right side of the traveling direction of the vehicle.

FIGS. 1 to 7 are diagrams for describing a vehicle according to the present disclosure. The vehicle according to the present disclosure will be described below with reference to FIGS. 1 to 7.

Figure 1:
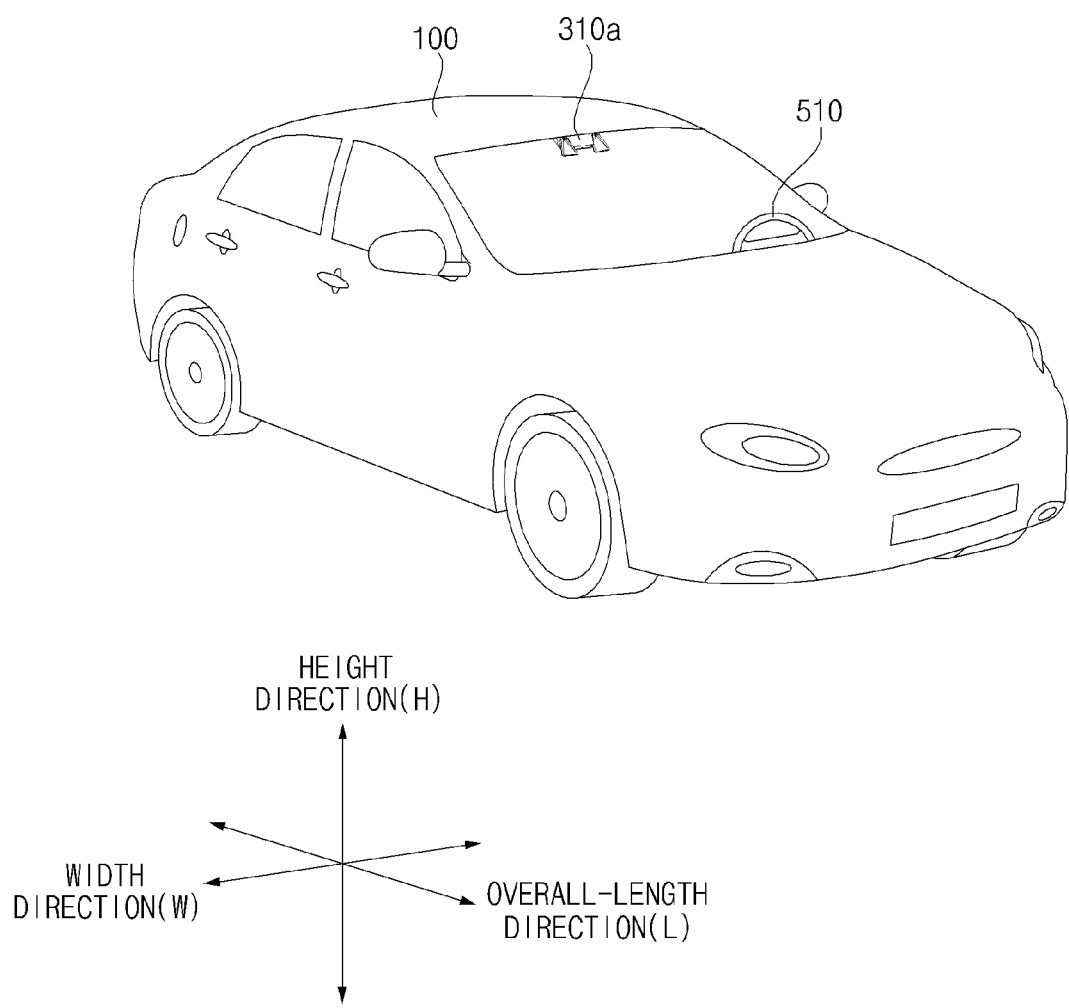
FIG. 1 is a diagram illustrating an example of an exterior of a vehicle.
Figure 2:
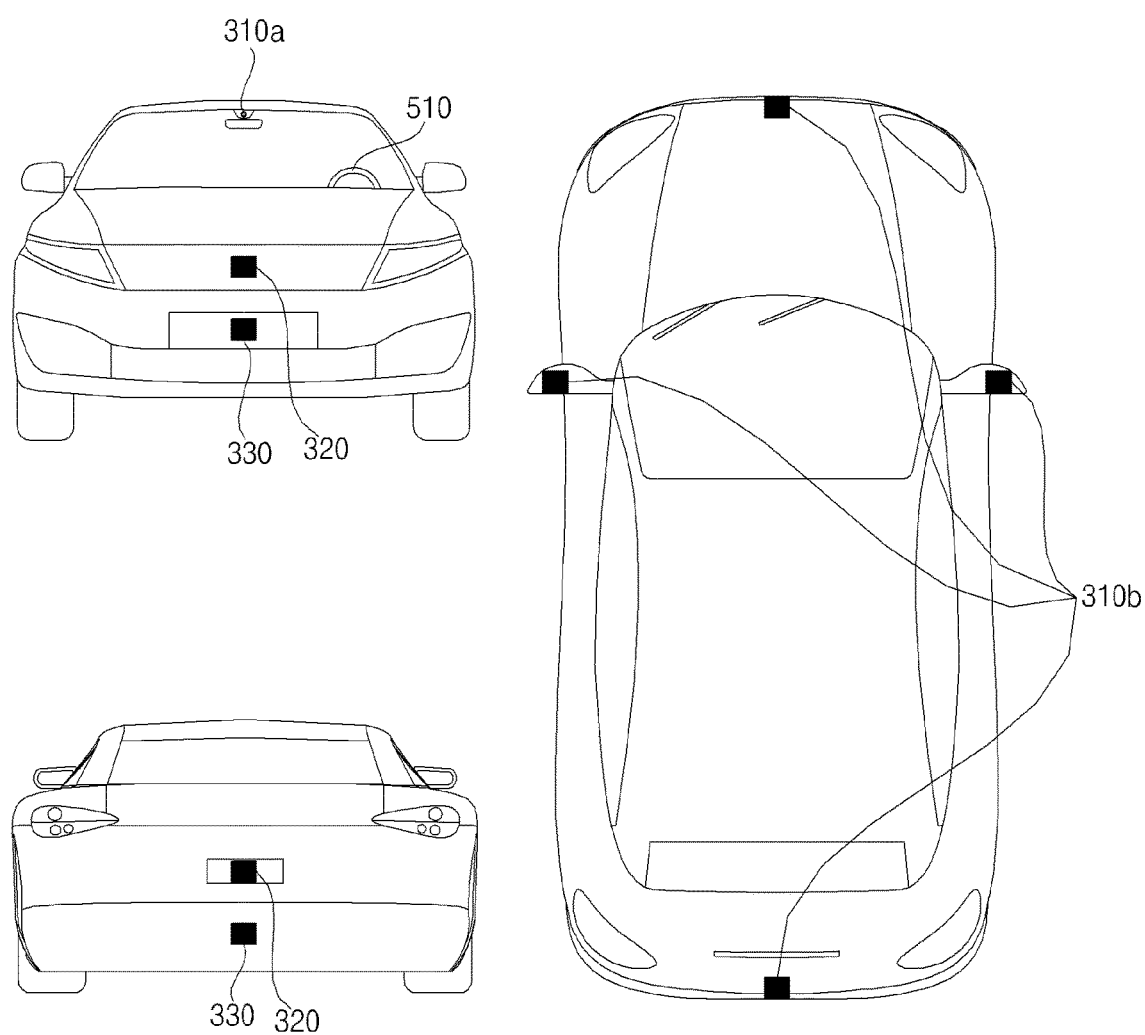
FIG. 2 is a diagram illustrating an example of a vehicle at various angles.
Figure 3:
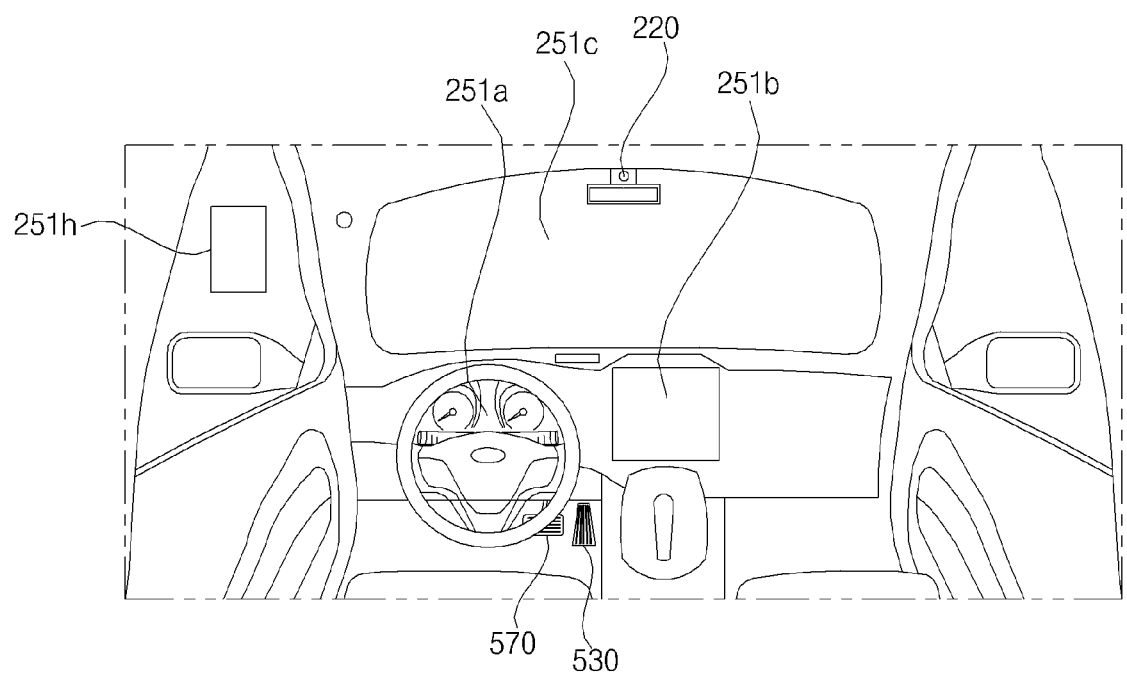
FIGS. 3 and 4 are views illustrating an interior portion of an example of a vehicle.
Figure 4:
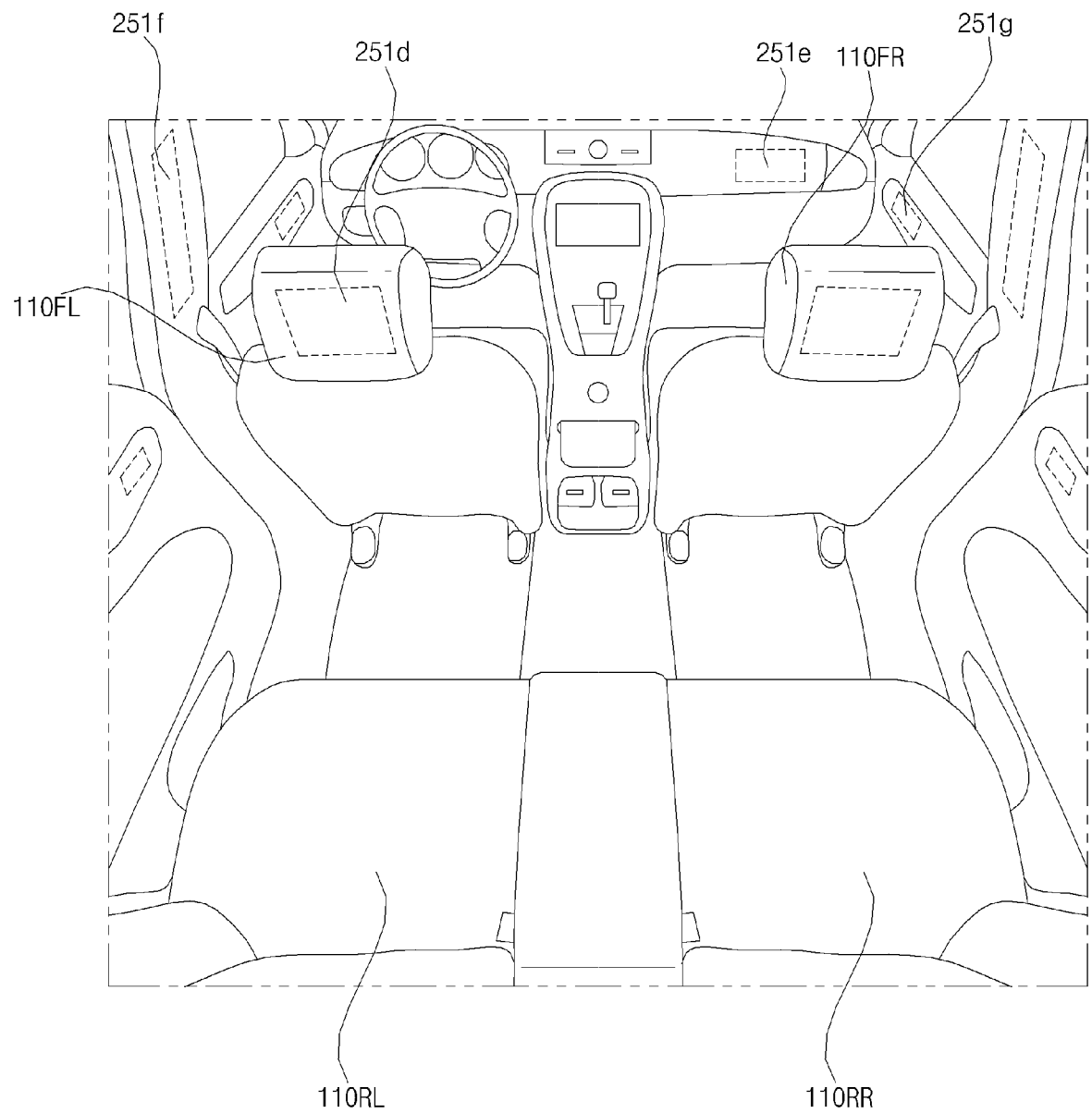
Figure 5:
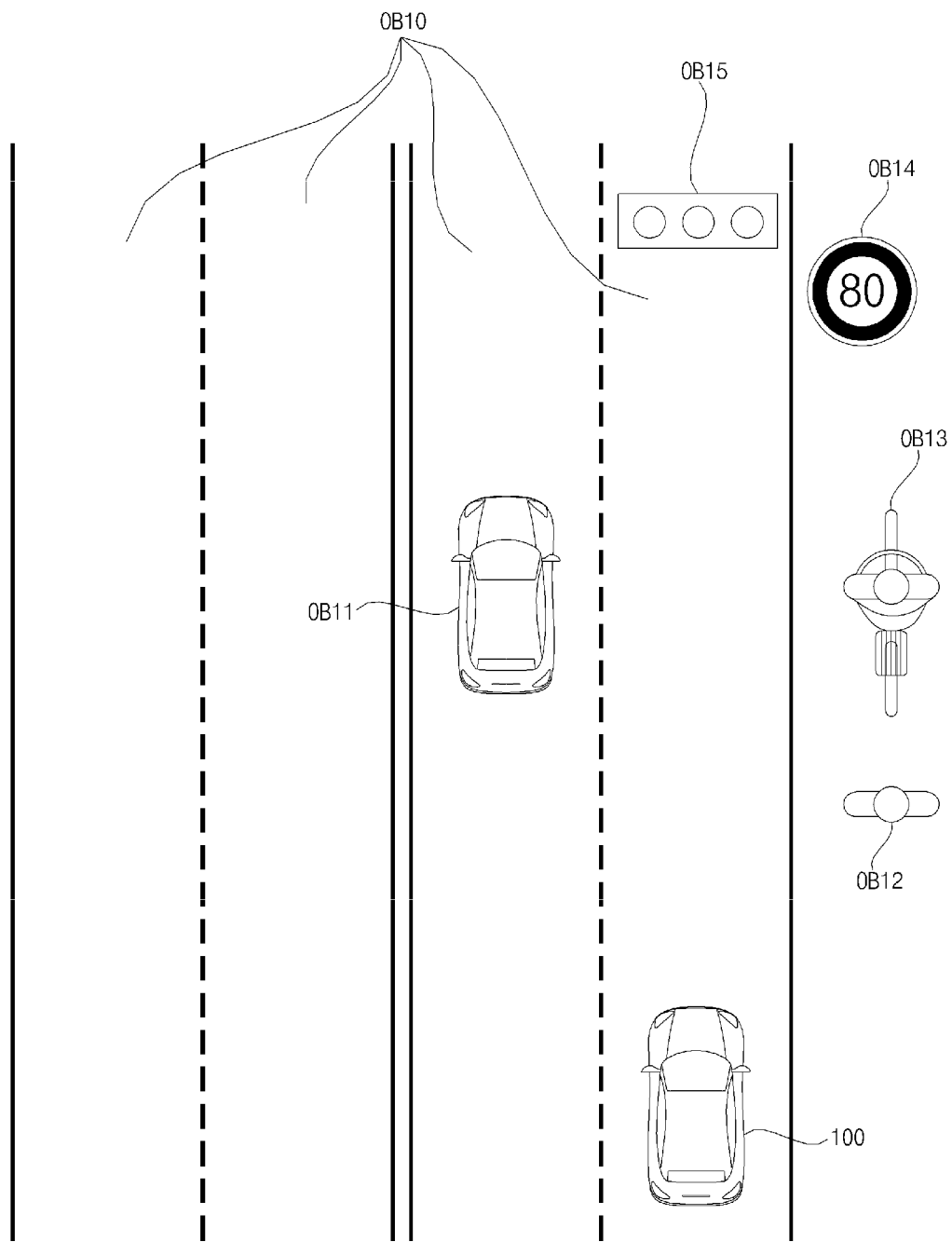
FIGS. 5 and 6 are reference views illustrating examples of objects that are relevant to driving.
Figure 6:
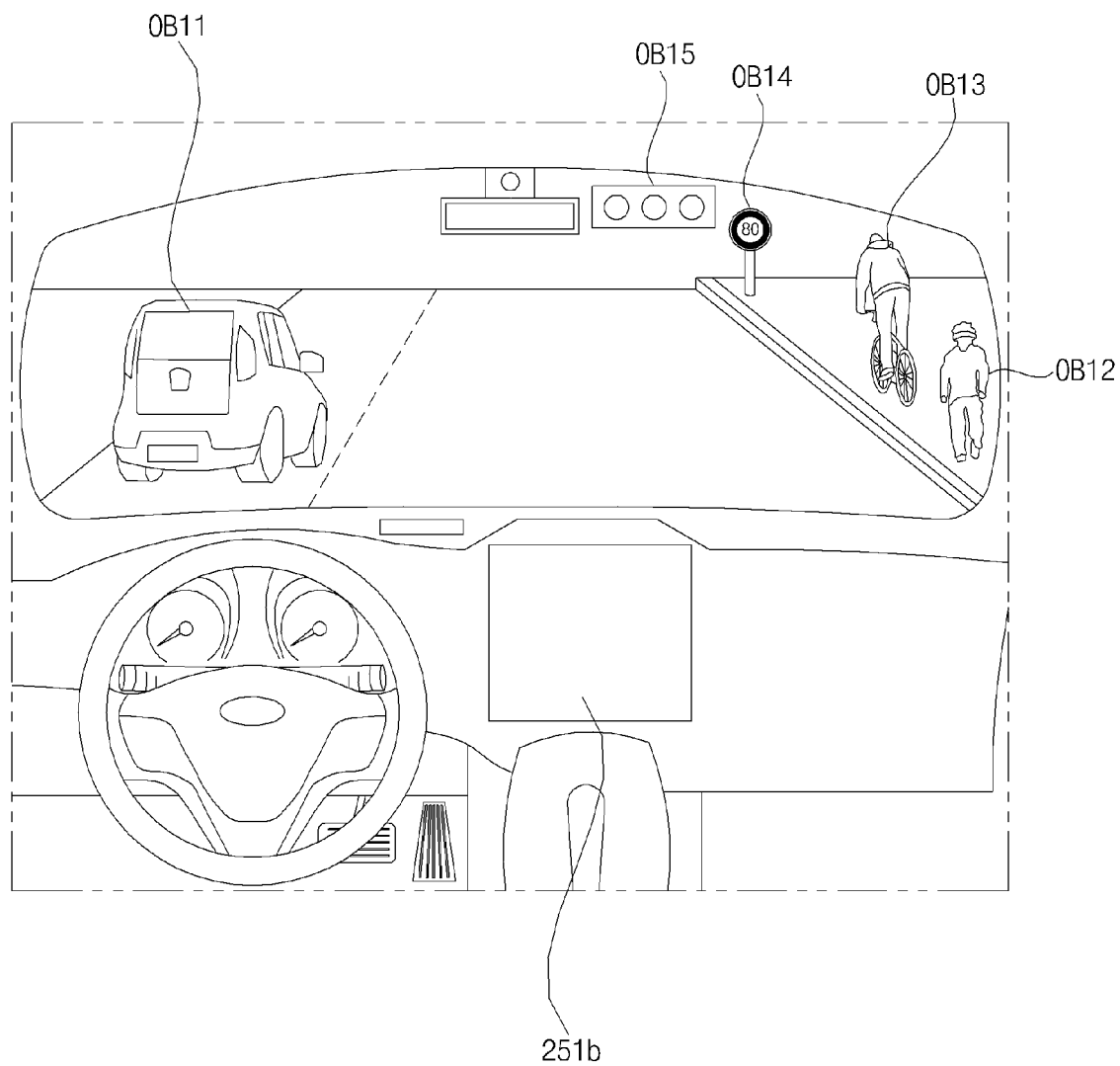
Figure 7:
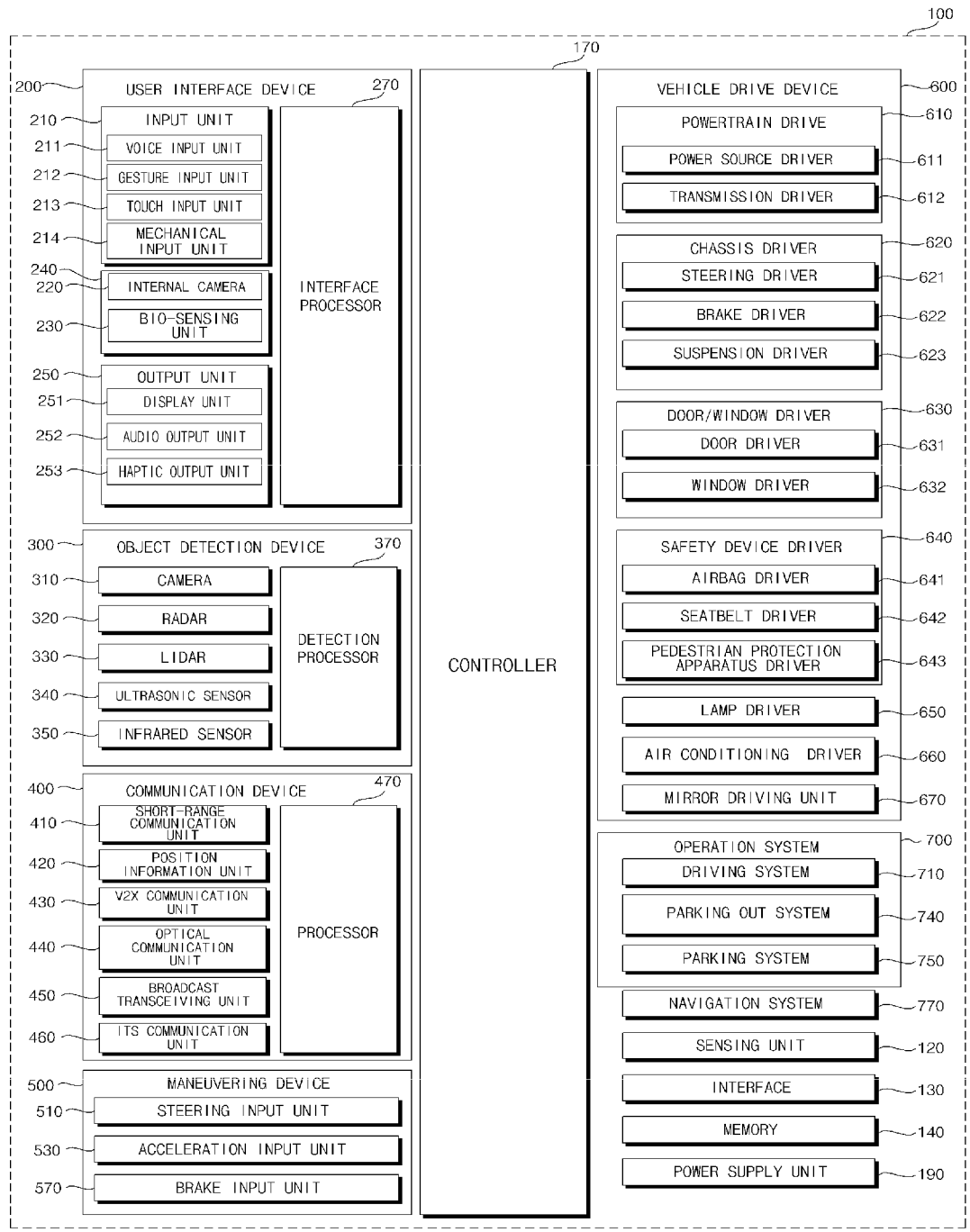
FIG. 7 is a block diagram illustrating subsystems of an example of a vehicle.

FIG. 1 illustrates an example of an exterior of a vehicle. FIG. 2 illustrates an example of a vehicle at various angles. FIGS. 3 and 4 illustrate an interior portion of an example of a vehicle. FIGS. 5 and 6 illustrate examples of objects that are relevant to driving. FIG. 7 illustrates subsystems of an example of a vehicle.

Referring to FIGS. 1 to 7, a vehicle 100 may include wheels rotated by a power source and a steering input device 510 for steering the vehicle 100.

The vehicle 100 may include various driver assistance devices. A driver assistance device assists a driver on the basis of information acquired by various sensors. Such a driver assistance device may be called an advanced driver assistance system (ADAS).

The vehicle 100 may include various lighting devices for vehicles. The lighting devices for vehicles may include a headlamp, a rear combination lamp, a turn signal lamp, a room lamp and the like. The rear combination lamp includes a brake lamp and a tail lamp.

The vehicle 100 may include an internal sensing device and an external sensing device.

An overall length refers to the length from the front part to the rear part of the vehicle 100, a width refers to the width of the vehicle 100 and a height refers to the length from the bottom of the wheels to the top. In the following description, an overall length direction refers to a direction which is a basis of measurement of the overall length of the vehicle 100, a width direction W refers to a direction which is a basis of measurement of the width of the vehicle 100, and a height direction H refers to a direction which is a basis of measurement of the height of the vehicle 100.

The vehicle 100 may be an autonomous vehicle. The vehicle 100 can autonomously travel under the control of a controller 170. The vehicle 100 can autonomously travel on the basis of first information.

The first information is acquired or provided through various units included in the vehicle 100. The first information may be information used by the controller 170 or an operation system 700 to control the vehicle 100. The first information may include vehicle driving information associated with the driving of the vehicle.

The first information may include at least one of object information acquired by an object detection device 300, communication information received by a communication device 400 from an external communication device, user input received by a user interface device 200 or a maneuvering device 500, navigation information provided by a navigation system 770, various types of sensing information provided by a sensing unit 120, information acquired and provided by an interface 130, or information stored in a memory 140.

The first information may be acquired through at least one of the user interface device 200, the object detection device 300, the communication device 400, the maneuvering device 500, the navigation system 770, the sensing unit 120, the interface 130 or the memory 140. The first information may be provided to the controller 170 or the operation system

700. The controller 170 of the operation system 700 can control the vehicle 100 to autonomously travel on the basis of the first information.

The object information is information about an object detected by the object detection device 300. For example, the object information may be information about the shape, position, size and color of an object. For example, the object information may be information about a lane, an image indicated on the surface of a road, an obstacle, other vehicles, a pedestrian, traffic lights, various structures, a traffic sign, and the like.

The communication information received by the communication device 400 may be information transmitted from an external device which can communicate with the vehicle. For example, the communication information may include at least one of information transmitted from other vehicles, information transmitted from a mobile terminal, or information transmitted from traffic infrastructure and information existing in a specific network. The traffic infrastructure may include traffic lights which can transmit information about a traffic signal.

In addition, the first information may include at least one of information about states of various devices included in the vehicle 100 or information about the position of the vehicle 100. For example, the first information may include information about errors in various devices included in the vehicle 100, information about operation states of various devices included in the vehicle 100, information about a traveling path of the vehicle 100, map information, and the like.

For example, the controller 170 or the operation system 700 may determine the type, position and movement of an object around the vehicle 100 on the basis of the first information. The controller 170 or the operation system 700 may determine a likelihood of the vehicle colliding with an object, the type of the road on which the vehicle 100 travels, a traffic signal around the vehicle 100, movement of the vehicle 100, and the like on the basis of the first information.

Among the first information, information about the surrounding environment or situation of the vehicle may be called surrounding environment information or surrounding situation information.

Passenger information is information about a passenger of the vehicle 100. Among the first information, information related to a passenger may be called passenger information.

The passenger information may be acquired through an internal camera 220 or a bio-sensing unit 230. In this case, the passenger information may include at least one of an image of a passenger of the vehicle 100 or bio-information of the passenger.

For example, the passenger information may be an image of a passenger acquired through the internal camera 220. For example, the bio-information may be information about the body temperature, pulse and brainwave of the passenger acquired through the bio-sensing unit 230.

For example, the controller 170 may determine the position, shape, gaze, face, action, expression, sleepiness, health condition, emotional state and the like of the passenger on the basis of the passenger information.

In addition, the passenger information may be information transmitted by a mobile terminal of the passenger and received by the communication device 400. For example, the passenger information may be authentication information for authenticating the passenger.

The passenger information may be acquired through a passenger detector 240 or the communication device 400 and provided to the controller 170. The passenger information may be included in the first information.

Vehicle state information is information related to states of various units included in the vehicle 100. Among the first information, information related to states of units of the vehicle 100 may be called vehicle state information.

For example, the vehicle state information may include information about operation states and errors of the user interface device 200, the object detection device 300, the communication device 400, the maneuvering device 500, a Vehicle drive device 600, the operation system 700, the navigation system 770, the sensing unit 120, the interface 130 and the memory 140.

The controller 170 may determine operations or errors of various units included in the vehicle 100 on the basis of the vehicle state information. For example, the controller 170 may determine whether a GPS signal of the vehicle 100 is normally received, whether abnormality occurs in at least one sensor included in the vehicle 100 and whether each device included in the vehicle 100 normally operates on the basis of the vehicle state information.

The vehicle state information may be included in the first information.

A control mode of the vehicle 100 may be a mode indicating a subject which controls the vehicle 100.

For example, the control mode of the vehicle 100 may include an autonomous mode in which the controller 170 or the operation system 700 included in the vehicle 100 controls the vehicle 100, a manual mode in which a driver mounted in the vehicle 100 controls the vehicle 100, and a remote control mode in which a device other than the vehicle 100 controls the vehicle 100.

When the vehicle 100 is in the autonomous mode, the controller 170 or the operation system 700 can control the vehicle 100 on the basis of the first information. Accordingly, the vehicle 100 can travel without a user's command through the maneuvering device 500. For example, the vehicle 100 in the autonomous mode can travel on the basis of information, data or signals generated in the driving system 710, a pulling-out system 740 and a parking system 750.

When the vehicle 100 is in the manual mode, the vehicle 100 may be controlled by a user's command with respect to at least one of steering, acceleration or deceleration received through the maneuvering device 500. In this case, the maneuvering device 500 can generate an input signal corresponding to the user's command and provide the input signal to the controller 170. The controller 170 can control the vehicle 100 on the basis of the input signal provided by the maneuvering device 500.

When the vehicle 100 is in the remote control mode, a device other than the vehicle 100 can control the vehicle 100. When the vehicle 100 travels in the remote control mode, the vehicle 100 can receive a remote control signal transmitted from the other device through the communication device 400. The vehicle 100 can be controlled on the basis of the remote control signal.

The vehicle 100 can enter one of the autonomous mode, the manual mode and the remote control mode on the basis of user input received through the user interface device 200.

The control mode of the vehicle 100 can switch to one of the autonomous mode, the manual mode and the remote control mode on the basis of the first information. For example, the control mode of the vehicle 100 can switch from the manual mode to the autonomous mode or switch from the autonomous mode to the manual mode on the basis of object information generated in the object detection device 300. The control mode of the vehicle 100 can switch from the manual mode to the autonomous mode or switch from the autonomous mode to the manual mode on the basis of information received through the communication device 400.

As illustrated in FIG. 7, the vehicle 100 may include the user interface device 200, the object detection device 300, the communication device 400, the maneuvering device 500, the Vehicle drive device 600, the operation system 700, the navigation system 770, the sensing unit 120, the interface 130, the memory 140, the controller 170 and a power supply unit 190. The vehicle 100 may further include components in addition to the components described in the specification or may not include some of the components described in the specification according to implementations.

The user interface device 200 is a device for interfacing between the vehicle 100 and a user. The user interface device 200 may receive user input and provide information generated in the vehicle 100 to the user. The vehicle 100 can realize user interfaces or user experience through the user interface device 200.

The user interface device 200 may include an input unit 210, the internal camera 220, the bio-sensing unit 230, an output unit 250 and an interface processor 270.

The user interface device 200 may further include other components in addition to the components described in the specification or may not include some of the components described in the specification according to an implementation.

The input unit 210 receives a user's command from the user. Data collected by the input unit 210 may be analyzed by the interface processor 270 and recognized as a control command of the user.

The input unit 210 may be provided inside of the vehicle. For example, the input unit 210 may be provided to a region of a steering wheel, a region of an instrument panel, a region of a seat, a region of each pillar, a region of a door, a region of a center console, a region of a head lining, a region of a sun visor, a region of a windshield, a region of a window, or the like.

The input unit 210 may include a voice input unit 211, a gesture input unit 212, a touch input unit 213 and a mechanical input unit 214.

The voice input unit 211 may convert a voice input of the user into an electronic signal. The converted electronic signal may be provided to the interface processor 270 or the controller 170.

The voice input unit 211 may include one or more microphones.

The gesture input unit 212 may convert gesture input into an electronic signal. The converted electronic signal may be provided to the interface processor 270 or the controller 170.

The gesture input unit 212 may include at least one of an infrared sensor or an image sensor for sensing gesture input of the user.

The gesture input unit 212 may detect a three-dimensional gesture input of the user according to an implementation. To this end, the gesture input unit 212 may include a plurality of light output units for outputting infrared light or a plurality of image sensors.

The gesture input unit 212 may detect a three-dimensional gesture input of the user through a TOF (Time of Flight), a structured light, or disparity.

The touch input unit 213 may convert touch input of the user into an electronic signal. The converted electronic signal may be provided to the interface processor 270 or the controller 170.

The touch input unit 213 may include a touch sensor for sensing touch input of the user.

According to an implementation, the touch input unit 213 may be integrated with a display 251 to implement a touchscreen. Such a touchscreen may provide both an input interface and an output interface between the vehicle 100 and the user.

The mechanical input unit 214 may include at least one of a button, a dome switch, a jog wheel or a jog switch. An electronic signal generated by the mechanical input unit 214 may be provided to the interface processor 270 or the controller 170.

The mechanical input unit 214 may be provided to the steering wheel, a center fascia, the center console, a cockpit module, a door, or the like.

The passenger detector 240 may detect a passenger seated in the vehicle 100. The passenger detector 240 may include the internal camera 220 and the bio-sensing unit 230.

The internal camera 220 may capture an image of the inside of the vehicle. The interface processor 270 may detect a state of the user on the basis of the image of the inside of the vehicle. For example, the detected state of the user may be the gaze, face, action, expression and position of the user.

The interface processor 270 may determine the gaze, face, action, expression and position of the user on the basis of the image of the inside of the vehicle captured by the internal camera 220. The interface processor 270 may determine a gesture of the user on the basis of the image of the inside of the vehicle. A result of determination of the interface processor 270 on the basis of the image of the inside of the vehicle may be called passenger information. In this case, the passenger information may be information indicating a gaze direction, action, expression, gesture and the like of the user. The interface processor 270 can provide the passenger information to the controller 170.

The bio-sensing unit 230 may acquire bio-information of the user. The bio-sensing unit 230 may include a sensor capable of acquiring bio-information of the user and acquire fingerprint information, heartbeat information and brainwave information of the user using the sensor. The bio-information may be used for user authentication or determination of a user state.

The interface processor 270 may determine a user state on the basis of the bio-information of the user acquired by the bio-sensing unit 230. A user state determined by the interface processor 270 may be called passenger information. In this case, the passenger information is information indicating whether the user passes out, whether the user dozes, whether the user is excited, whether the user is having a medical emergency, or the like. The interface processor 270 can provide the passenger information to the controller 170.

The output unit 250 generates an output related to sense of vision, sense of hearing or sense of touch.

The output unit 250 may include at least one of the display 251, an audio output unit 252 or a haptic output unit 253.

The display 251 may display graphical objects corresponding to various types of information.

The display 251 may include at least one of a liquid crystal display (LCD), a thin film transistor-liquid crystal display (TFT-LCD), an organic light-emitting diode (OLED), a flexible display, a 3D display or an e-ink display.

The display 251 may implement a touchscreen by forming a layered structure with the touch input unit 213 or be integrated with the touch input unit 213.

The display 251 may be implemented as a head up display (HUD). When the display 251 is implemented as a HUD, the display 251 may include a projection module to output information through an image projected onto the windshield or window.

The display 251 may include a transparent display. The transparent display may be attached to the windshield or window.

The transparent display may display a predetermined screen with a predetermined transparency. The transparent display may include at least one of a transparent thin film electroluminescent TFEL display, a transparent OLED display, a transparent LCD, a transmissive transparent display or a transparent LED display in order to have transparency. The transparency of the transparent display may be controlled.

The user interface device 200 may include a plurality of displays 251*a* to 251*g*.

The display 251 may be provided to a region of the steering wheel, regions 251*a*, 251*b* and 25*e* of the instrument panel, a region 251*d* of a seat, a region 251*f* of each pillar, a region 251*g* of a door, a region of the center console, a region of the head lining or a region of the sun visor, or be implemented in a region 251*c* of the windshield or a region 251*h* of the window.

The audio output unit 252 converts an electronic signal provided by the interface processor 270 or the controller 170 into an audio signal and outputs the audio signal. To this end, the audio output unit 252 may include one or more speakers.

The haptic output unit 253 generates a haptic output. For example, the haptic output may be vibration. The haptic output unit 253 operates to vibrate the steering wheel, seat belts, and seats 110FL, 110FR, 110RL and 110RR such that the user can recognize the output.

The interface processor 270 can control the overall operation of each unit of the user interface device 200.

According to an implementation, the user interface device 200 may include a plurality of interface processors 270 or may not include the interface processor 270.

When the interface processor 270 is not included in the user interface device 200, the user interface device 200 may operate under the control of a processor of another device included in the vehicle 100 or the controller 170.

In some implementations, the user interface device 200 may be called a multimedia device for a vehicle.

The user interface device 200 may operate under the control of the controller 170.

The object detection device 300 detects an object located around the vehicle 100.

Objects may be various things related to driving of the vehicle 100.

Referring to FIGS. 5 and 6, objects O may include a lane OB10, a line defining a lane, another vehicle OB11, a pedestrian OB12, a two-wheeled vehicle IB13, traffic signals OB14 and OB15, a curb defining a sidewalk, light, a road, a structure, a speed bump, a landmark, an animal, etc.

The lane OB10 may be an inside lane, a lane beside an inside lane or a lane in which an opposite vehicle travels. The lane OB10 may include left and right lines which define the lane.

The other vehicle OB11 may be a vehicle which is traveling around the vehicle 100. The other vehicle OB11 may be located within a predetermined distance of the vehicle 100. For example, the other vehicle OB11 may be a vehicle preceding or following the vehicle 100. For example, the other vehicle OB11 may be a vehicle traveling beside the vehicle 100.

The pedestrian OB12 may be a person located around the vehicle 100. The pedestrian OB12 may be a person located within a predetermined distance of the vehicle 100. For example, the pedestrian OB12 may be a person located on a sidewalk or a road.

The two-wheeled vehicle OB 13 may refer to a vehicle located around the vehicle 100 and moving using two wheels. The two-wheeled vehicle OB12 may be a vehicle having two wheels and located within a predetermined distance of the vehicle 100. For example, the two-wheeled vehicle OB13 may be a motorcycle or a bicycle located on a sidewalk or a road.

The traffic signals OB14 and OB15 may include a traffic light OB15, a traffic sign OB14 and a pattern or text on a road surface.

The light may be generated from a lamp included in the other vehicle OB11. The light may be generated from a streetlamp. The light may be sunlight. The road may include a road surface, a curve, slopes such as an uphill road and a downhill road, etc. The landmark may include a mountain, a hill, etc.

The structure may be an object located around a road and fixed to the ground. For example, the structure may include a streetlamp, a street tree, a building, a telephone pole, a traffic light, a bridge, a curb, a guardrail, etc.

Objects may be divided into a moving object and a fixed object. The moving object is a movable object. For example, the moving object may include other vehicles and pedestrians. The fixed object is an object which cannot move. For example, the fixed object may include a traffic sign, a road, a structure and a line.

The object detection device 300 may detect an obstacle located around the vehicle 100. The obstacle may be one of an object, a hole formed in a road, a start point of an uphill road, a start point of a downhill road, an inspection pit, a speed bump and a boundary protrusion. The object may have volume and weight.

The object detection device 300 may include a camera 310, a radar 320, a lidar 330, an ultrasonic sensor 340, an infrared sensor 350 and a detection processor 370.

According to an implementation, the object detection device 300 may further include other components in addition to the components described herein or may not include some of the components described herein.

The camera 310 may be provided at an appropriate position outside the vehicle in order to capture an image of the outside of the vehicle. The camera 310 may provide the captured image to the detection processor 370. The camera 310 may be a mono camera, a stereo camera 310*a*, an around view monitoring (AVM) camera 310*b* or a 360-degree camera.

For example, the camera 310 may be positioned in proximity to the windshield inside of the vehicle in order to capture a front view image of the vehicle. Alternatively, the camera 310 may be positioned near a front bumper or a radiator grille.

For example, the camera 310 may be positioned in proximity to the rear glass inside of the vehicle in order to capture a rear-view image of the vehicle. Alternatively, the camera 310 may be positioned near the rear bumper, a trunk or a tailgate.

For example, the camera 310 may be positioned in proximity to at least one of side windows inside of the vehicle in order to capture a side view image of the vehicle. Alternatively, the camera 310 may be positioned near a side mirror, a fender or a door.

The radar (radio detection and ranging) 320 may include an electromagnetic wave transmitter and receiver. The radar 320 may be implemented as a pulse radar or a continuous wave radar according to the principle of emission. The radar 320 may be implemented as a continuous wave radar using a frequency modulated continuous wave (FMCW) scheme or a frequency shift keying (FSK) scheme depending on signal waveform.

The radar 320 can detect an object on the basis of a TOF or a phase shift through electromagnetic waves and detect the position of the detected object, a distance from the detected object, and a relative speed with respect to the detected object.

The radar 320 may be provided at an appropriate position outside the vehicle in order to detect an object located in front of, behind or at the side of the vehicle.

The lidar (light detection and ranging) 330 may include a laser transmitter and receiver. The lidar 330 may be implemented through a TOF (Time of Flight) method or a phase-shift method. The lidar 330 may be implemented as a driving type or non-driving type.

When the lidar 330 is implemented as a driving type, the lidar 330 rotates by a motor and can detect an object around the vehicle 100.

When the lidar 330 is implemented as a non-driving type, the lidar 330 can detect an object positioned within a predetermined range on the basis of the vehicle 100 according to optical steering. The vehicle 100 may include a plurality of non-driving type lidars 330.

The lidar 330 may detect an object on the basis of a TOF or a phase shift through a laser beam and detect the position of the detected object, a distance from the detected object and a relative speed with respect to the detected object.

The lidar 330 may be provided at an appropriate position outside the vehicle in order to detect an object located in front of, behind or at the side of the vehicle.

The ultrasonic sensor 340 may include an ultrasonic transmitter and receiver. The ultrasonic sensor 340 may detect an object on the basis of ultrasonic waves and detect the position of the detected object, a distance from the detected object and a relative speed with respect to the detected object.

The ultrasonic sensor 340 may be provided at an appropriate position outside the vehicle in order to detect an object located in front of, behind or at the side of the vehicle.

The infrared sensor 350 may include an infrared transmitter and receiver. The infrared sensor 350 may detect an object on the basis of infrared light and detect the position of the detected object, a distance from the detected object and a relative speed with respect to the detected object.

The infrared sensor 350 may be provided at an appropriate position outside the vehicle in order to detect an object located in front of, behind or at the side of the vehicle.

The detection processor 370 may control the overall operation of each unit included in the object detection device 300.

The detection processor 370 may detect and track an object on the basis of a captured image. The detection processor 370 may perform calculation of a distance from an object, calculation of a relative speed with respect to the object, determination of the type, position, size, shape, color and moving path of the object, determination of the contents of detected text, etc.

The detection processor 370 may detect and track an object on the basis of reflected electromagnetic waves, which have been transmitted and reflected by the object. The detection processor 370 may perform calculation of a distance to the object and calculation of a relative speed with respect to the object on the basis of the electromagnetic waves.

The detection processor 370 may detect and track an object on the basis of a reflected laser beam, which has been transmitted and reflected by the object. The detection processor 370 may perform calculation of a distance to the object and calculation of a relative speed with respect to the object on the basis of the laser beam.

The detection processor 370 may detect and track an object on the basis of reflected ultrasonic waves, which have been transmitted and reflected by the object. The detection processor 370 may perform calculation of a distance to the object and calculation of a relative speed with respect to the object on the basis of the ultrasonic waves.

The detection processor 370 may detect and track an object on the basis of reflected infrared rays, which have been transmitted and reflected by the object. The detection processor 370 may perform calculation of a distance to the object and calculation of a relative speed with respect to the object on the basis of the infrared rays.

The detection processor 370 may generate object information on the basis of at least one of an image acquired through the camera 310, reflected electromagnetic waves received through the radar 320, a reflected laser beam received through the lidar 330, reflected ultrasonic waves received through the ultrasonic sensor 340, or reflected infrared rays received through the infrared sensor 350.

The object information may be information about the type, position, size, shape, color, moving speed and speed of an object around the vehicle 100, detected text, and the like.

For example, the object information may indicate presence or absence of a lane around the vehicle, presence or absence of other vehicles traveling around the vehicle while the vehicle 100 is stopped, likelihood of the vehicle colliding with an object, distribution of pedestrians or bicycles around the vehicle 100, the type of a road on which the vehicle 100 travels, a state of a traffic light around the vehicle 100, movement of the vehicle 100, etc. The object information may be included in the first information.

The detection processor 370 may provide the generated object information to the controller 170.

According to an implementation, the object detection device 300 may include a plurality of detection processors 370 or may not include the detection processor 370. For example, the camera 310, the radar 320, the lidar 330, the ultrasonic sensor 340 and the infrared sensor 350 may include individual processors.

The object detection device 300 may operate under the control of a processor of a device included in the vehicle 100 or the controller 170.

The communication device 400 is a device for performing communication with an external device. Here, the external device may be one of other vehicles, a mobile terminal, a wearable device and a server.

The communication device 400 may include at least one of a transmission antenna and a reception antenna for performing communication, or a radio frequency (RF) circuit and an RF element capable of implementing various communication protocols.

The communication device 400 may include a short-range communication unit 410, a position information unit 420, a V2X communication unit 430, an optical communication unit 440, a broadcast transceiver unit 450, an intelligent transport system (ITS) communication unit 460 and a communication processor 470.

According to an implementation, the communication unit 400 may further include other components in addition to the components described in the specification or may not include some of the components described in the specification.

The short-range communication unit 410 is a unit for short-range communication. The short-range communication unit 410 may support short-range communication using at least one of Bluetooth™, RFID (Radio Frequency Identification), IrDA (Infrared Data Association), UWB (Ultra Wideband), ZigBee, NFC (Near Field Communication), Wi-Fi, Wi-Fi Direct, or Wireless USB (Wireless Universal Serial Bus).

The short-range communication unit 410 may establish wireless area networks to perform short-range communication between the vehicle 100 and at least one external device.

The position information unit 420 is a unit for acquiring position information of the vehicle 100. For example, the position information unit 420 may include at least one of a GPS (Global Positioning System) module, a DGPS (Differential Global Positioning System) module, or a CDGPS (Carrier phase Differential GPS) module.

The position information unit 420 may acquire GPS information through the GPS module. The position information unit 420 may deliver the acquired GPS information to the controller 170 or the communication processor 470. The GPS information acquired by the position information unit 420 may be used for autonomous driving of the vehicle 100. For example, the controller 170 can control the vehicle 100 to autonomously travel on the basis of the GPS information and navigation information acquired through the navigation system 770.

The V2X communication unit 430 is a unit for wireless communication with a server (V2I: Vehicle to Infrastructure), other vehicles (V2V: Vehicle to Vehicle) or a pedestrian (V2P: Vehicle to Pedestrian). The V2X communication unit 430 may include an RF circuit capable of implementing V2I, V2V and V2P communication protocols.

The optical communication unit 440 is a unit for performing communication with an external device using light. The optical communication unit 440 may include a light transmitter for converting an electrical signal into an optical signal and transmitting the optical signal to the outside and a light receiver for converting a received optical signal into an electrical signal.

According to an implementation, the light transmitter may be integrated with a lamp included in the vehicle 100.

The broadcast transceiver unit 450 is a unit for receiving a broadcast signal from an external broadcast management server through a broadcast channel or transmitting a broadcast signal to the broadcast management server. Broadcast channels may include satellite channels and terrestrial channels. Broadcast signals may include TV broadcast signals, radio broadcast signals and data broadcast signals.

The ITS communication unit 460 performs communication with a service which provides an intelligent transport system. The ITS communication unit 460 may receive information about various traffic conditions from a server of the ITS. The information about traffic conditions may include traffic congestion, traffic condition per road, traffic per section, etc.

The communication processor 470 can control the overall operation of each unit of the communication device 400.

The first information may include information received through at least one of the short-range communication unit 410, the position information unit 420, the V2X communication unit 430, the optical communication unit 440, the broadcast transceiver unit 450, or the ITS communication unit 460.

For example, the first information may include information about positions, vehicle types, traveling routes, speeds, various sensing values, and the like of other vehicles, received from the other vehicles. When information about various sensing values of other vehicles is received through the communication device 400, the controller 170 can acquire information about various objects present around the vehicle 100 even if the vehicle 100 has no separate sensor.

For example, the first information can indicate the type, position and movement of an object around the vehicle 100, presence or absence of a lane around the vehicle 100, whether another vehicle around the vehicle 100 travels while the vehicle 100 is stopped, whether there is an area around the vehicle in which the vehicle can stop, likelihood of the vehicle colliding with an object, distribution of pedestrians or bicycles around the vehicle 100, the type of a road on which the vehicle 100 travels, a state of a traffic light around the vehicle 100, movement of the vehicle 100, etc.

According to an implementation, the communication device 400 may include a plurality of communication processors 470 or may not include the communication processor 470.

When the communication processor 470 is not included in the communication device 400, the communication device 400 may operate under the control of a processor or another device included in the vehicle 100 or the controller 170.

In some implementations, the communication device 400 may implement a multimedia device for a vehicle along with the user interface device 200. In this case, the multimedia device for a vehicle may be called a telematics device or an AVN (Audio Video Navigation) device.

The communication device 400 may operate under the control of the controller 170.

The maneuvering device 500 receives a user command for driving.

In the manual mode, the vehicle 100 can be driven on the basis of a signal provided by the maneuvering device 500.

The maneuvering device 500 may include a steering input device 510, an acceleration input device 530 and a brake input device 570.

The steering input device 510 may receive a user command with respect to steering of the vehicle 100 from the user. The user command with respect to steering may be a command corresponding to a specific steering angle. For example, the user command with respect to steering can correspond to 45 degrees to the right.

The steering input device 510 may be configured in the form of a wheel such that steering input according to rotation is applicable. In this case, the steering input device 510 may be called a steering wheel.

According to an implementation, the steering input device may be configured in the form of a touchscreen, a touch pad or a button.

The acceleration input device 530 may receive a user command with respect to acceleration of the vehicle 100 from the user.

The brake input device 570 may receive a user command with respect to deceleration of the vehicle 100 from the user. The acceleration input device 530 and the brake input device 570 may be configured in the form of a pedal.

According to an implementation, the acceleration input device 530 or the brake input device 570 may be configured in the form of a touchscreen, a touch pad or a button.

The maneuvering device 500 may operate under the control of the controller 170.

The Vehicle drive device 600 electrically controls driving of various devices included in the vehicle 100.

The Vehicle drive device 600 may include a powertrain driver 610, a chassis driver 620, a door/window driver 630, a safety device driver 640, a lamp driver 650 and an air-conditioning driver 660.

According to an implementation, the Vehicle drive device 600 may further include other components in addition to the components described in the specification or may not include some of the components described in the specification.

In some implementations, the Vehicle drive device 600 may include a processor. Each unit of the Vehicle drive device 600 may individually include a processor.

The powertrain driver 610 may control operation of a powertrain device.

The powertrain driver 610 may include a power source driver 611 and a transmission driver 612.

The power source driver 611 may control a power source of the vehicle 100.

For example, when a fossil fuel based engine is a power source, the power source driver 610 can perform electronic control for the engine. Accordingly, engine torque can be controlled. The power source driver 611 can adjust the engine torque under the control of the controller 170.

For example, when an electric energy based motor is a power source, the power source driver 610 can control the motor. The power source driver 610 can adjust the RPM, torque and the like of the motor under the control of the controller 170.

The transmission driver 612 may control a transmission.

The transmission driver 612 may adjust a state of the transmission. The transmission driver 612 can adjust the state of the transmission to "Drive (D)", "Reverse (R)", "Neutral (N)" or "Park (P)".

When an engine is a power source, the transmission driver 612 may adjust a gear engagement state in the "Drive (D)" state.

The chassis driver 620 may control operation of a chassis device.

The chassis driver 620 may include a steering driver 621, a brake driver 622 and a suspension driver 623.

The steering driver 621 may electronically control a steering apparatus in the vehicle 100. The steering driver 621 can change a traveling direction of the vehicle.

The brake driver 622 may electronically control a brake apparatus in the vehicle 100. For example, the brake driver 622 can control operation of a brake attached to wheels to reduce the speed of the vehicle 100.

The brake driver 622 may individually control a plurality of brakes. The brake driver 622 may differently control brake power applied to a plurality of wheels.

The suspension driver 623 may electronically control a suspension apparatus in the vehicle 100. For example, when a road has an uneven surface, the suspension driver 623 can control the suspension apparatus to reduce vibration of the vehicle 100.

In some implementations, the suspension driver 623 may individually control a plurality of suspensions.

The door/window driver 630 may electronically control a door apparatus or a window apparatus in the vehicle 100.

The door/window driver 630 may include a door driver 631 and a window driver 632.

The door driver 631 may control the door apparatus. The door driver 631 may control opening and closing of a plurality of doors included in the vehicle 100. The door driver 631 may control opening or closing of a trunk or a tailgate. The door driver 631 may control opening or closing of a sunroof.

The window driver 632 may electronically control the window apparatus. The window driver 632 may control opening or closing of a plurality of windows included in the vehicle 100.

The safety apparatus driver 640 may electronically control various safety apparatuses in the vehicle 100.

The safety apparatus driver 640 may include an airbag driver 641, a seatbelt driver 642 and a pedestrian protection apparatus driver 643.

The airbag driver 641 may electronically control an airbag apparatus in the vehicle 100. For example, the airbag driver 641 may control an airbag to be deployed when danger is sensed.

The seatbelt driver 642 may electronically control a seatbelt apparatus in the vehicle 100. For example, the seatbelt driver 642 can control seatbelts to fasten passengers to seats 110FL, 110FR, 110RL and 110RR when danger is sensed.

The pedestrian protection apparatus driver 643 may electronically control a hood lift and a pedestrian airbag. For example, the pedestrian protection apparatus driver 643 can control the hood lift to move up and control the pedestrian airbag to be deployed when collision with a pedestrian is sensed.

The lamp driver 650 may electronically control various lamp apparatuses in the vehicle 100.

The air-conditioning driver 660 may electronically control an air conditioner in the vehicle 100. For example, the air-conditioning driver 660 can control the air conditioner to operate to supply cold air to the inside of the vehicle when the internal temperature of the vehicle is high.

The Vehicle drive device 600 may include a processor. Each unit of the Vehicle drive device 600 may individually include a processor.

The Vehicle drive device 600 may operate under the control of the controller 170.

The operation system 700 controls operation of the vehicle 100. The operation system 700 may operate in the autonomous mode. The operation system 700 can perform autonomous driving of the vehicle 100 on the basis of position information and navigation information of the vehicle 100. The operation system 700 may include a driving system 710, the pulling-out system 740 and the parking system 750.

According to an implementation, the operation system 700 may further include other components in addition to the components described in the specification or may not include some of the components described in the specification.

In some implementations, the operation system 700 may include a processor. Each unit of the operation system 700 may individually include a processor.

According to an implementation, when the operation system 700 is implemented as software, the operation system 700 may be implemented by the controller 170.

According to an implementation, the operation system 700 may include at least one of the user interface device 200, the object detection device 300, the communication device 400, the Vehicle drive device 600 or the controller 170.

The driving system 710 may control the vehicle 100 to autonomously travel.

The driving system 710 may provide a control signal to the Vehicle drive device 600 on the basis of the first information such that the vehicle travels. The Vehicle drive device 600 can operate on the basis of the control signal provided by the driving system 600. Accordingly, the vehicle can autonomously travel.

For example, the driving system 710 may control the vehicle 100 to travel by providing the control signal to the Vehicle drive device 600 on the basis of the object information provided by the object detection device 300.

For example, the driving system 710 can receive a signal from an external device through the communication device 400 and provide the control signal to the Vehicle drive device 600 to control the vehicle 100 to travel.

The pulling-out system 740 may control the vehicle 100 to autonomously start.

The pulling-out system 740 may provide a control signal to the Vehicle drive device 600 on the basis of the first information such that the vehicle starts. The Vehicle drive device 600 can operate on the basis of the control signal provided by the pulling-out system 740. Accordingly, the vehicle can autonomously start.

For example, the pulling-out system 740 can control the vehicle 100 to start by providing the control signal to the Vehicle drive device 600 on the basis of the object information provided by the object detection device 300.

For example, the pulling-out system 740 can control the vehicle 100 to start by receiving a signal from an external device through the communication device 400 and providing the control signal to the Vehicle drive device 600.

The parting system 750 may control the vehicle 100 to perform autonomous parking.

The parking system 750 may provide a control signal to the Vehicle drive device 600 on the basis of the first information such that the vehicle is parked. The Vehicle drive device 600 can operate on the basis of the control signal provided by the parking system 750. Accordingly, the vehicle can perform autonomous parking.

For example, the parking system 750 can control the vehicle 100 to be parked by providing the control signal to the Vehicle drive device 600 on the basis of the object information provided by the object detection device 300.

For example, the parking system 740 can control the vehicle 100 to be parked by receiving a signal from an external device through the communication device 400 and providing the control signal to the Vehicle drive device 600.

The navigation system 770 can provide navigation information. The navigation information may include at least one of map information, information on a set destination, route information, information about various objects on roads, lane information, traffic information or vehicle location information.

The navigation system 770 may include a separate memory and a processor. The memory may store navigation information. The processor may control the operation of the navigation system 770.

According to an implementation, the navigation system 770 may receive information from an external device through the communication device 400 and update prestored information.

According to an implementation, the navigation system 770 may be classified as a sub-element of the user interface device 200.

The sensing unit 120 may sense a state of the vehicle. The sensing unit 120 may include a posture sensor (e.g., a yaw sensor, a roll sensor and a pitch sensor), a collision sensor, a wheel sensor, a speed sensor, an inclination sensor, a weight sensor, a heading sensor, a yaw sensor, a gyro sensor, a position module, a vehicle forward/reverse movement sensor, a battery sensor, a fuel sensor, a tire sensor, a steering sensor according to rotation of a steering wheel, a vehicle internal temperature sensor, a vehicle internal humidity sensor, an ultrasonic sensor, an illumination sensor, an accelerator pedal position sensor, a brake pedal position sensor, etc.

The sensing unit 120 may acquire sensing signals with respect to vehicle posture information, vehicle collision information, vehicle direction information, vehicle position information (GPS information), vehicle angle information, vehicle speed information, vehicle acceleration information, vehicle inclination information, vehicle forward/reverse movement information, battery information, fuel information, tire information, vehicle lamp information, vehicle internal temperature information, vehicle internal humidity information, a steering wheel rotation angle, vehicle external illumination, pressure applied to the accelerator pedal, pressure applied to the brake pedal, etc. Information acquired by the sensing unit 120 may be included in the first information.

The sensing unit 120 may further include an accelerator pedal sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), etc.

The interface 130 may serve as a path between the vehicle 100 and various external devices connected to the vehicle 100. For example, the interface 130 can include a port connectable to a mobile terminal and be connected to the mobile terminal through the port. In this case, the interface 130 can exchange data with the mobile terminal.

Further, the interface 130 may serve as a path through which electric energy is supplied to the connected mobile terminal. When the mobile terminal is electrically connected to the interface 130, the interface 130 can provide electric energy supplied from the power supply unit 190 to the mobile terminal under the control of the controller 170.

The memory 140 is electrically connected to the controller 170. The memory 140 may store basic data about each unit, control data for operation control of each unit, and input/output data. The memory 140 may be a storage device such as a ROM, a RAM, an EPROM, a flash drive or a hard drive. The memory 140 may store various types of data for the overall operation of the vehicle 100, such as programs for processing or control of the controller 170.

According to an implementation, the memory 140 may be integrated with the controller 170 or may be implemented as a sub-element of the controller 170.

The power supply unit 190 may supply power necessary for operation of each component under the control of the controller 170. Particularly, the power supply unit 190 may be provided with power from an internal battery of the vehicle, or the like.

The controller 170 may control the overall operation of each unit included in the vehicle 100. The controller 170 may be called an electronic control unit (ECU).

The controller 170 may control the vehicle 100 to autonomously travel on the basis of information acquired through a device included in the vehicle 100 when the vehicle 100 is in the autonomous mode. For example, the controller 170 can control the vehicle 100 on the basis of navigation information provided by the navigation system 770 or information provided by the object detection device 300 or the communication device 400. The controller 170 may control the vehicle 100 on the basis of an input signal corresponding to a user command received by the maneuvering device 500 when the vehicle 100 is in the manual mode. The controller 170 may control the vehicle 100 on the basis of a remote control signal received by the communication device 400 when the vehicle 100 is in the remote control mode.

Various processors and the controller 170 included in the vehicle 100 may be implemented using at least one of ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, or electrical units for executing other functions.

Figure 8:
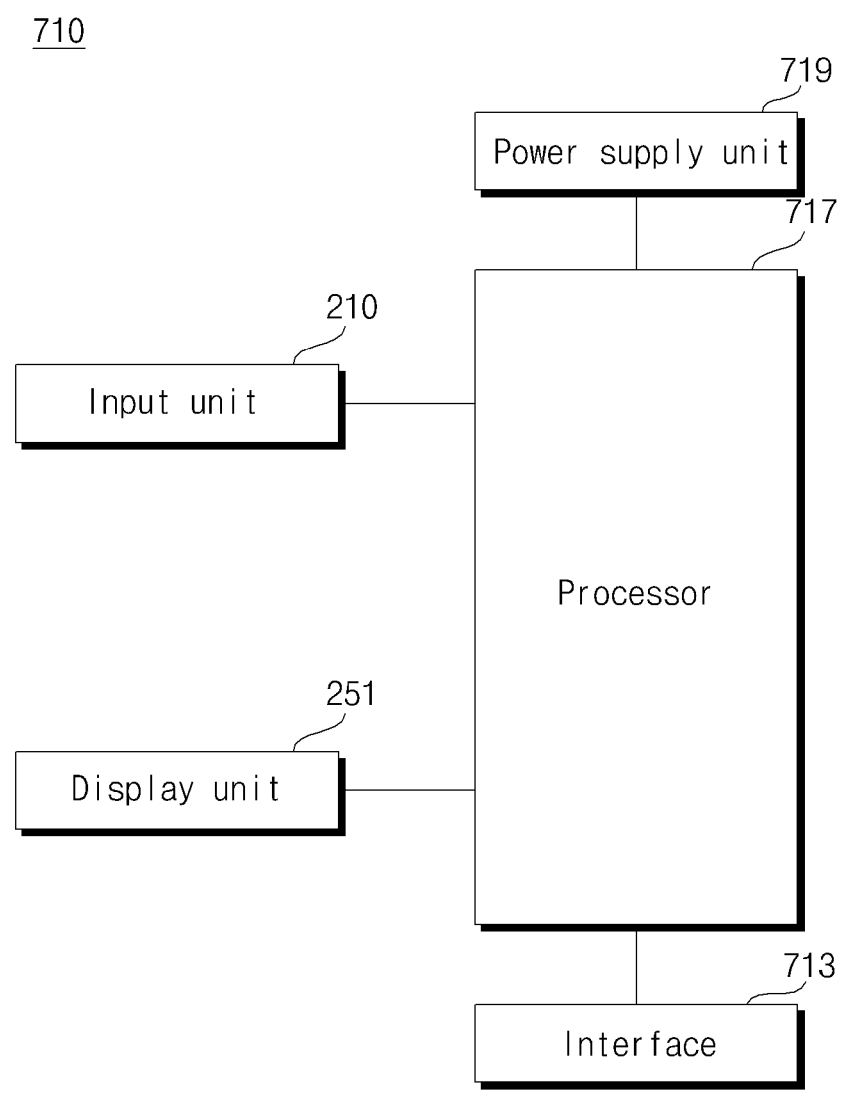
FIG. 8 is a block diagram illustrating a driving system for vehicles according to implementations of the present disclosure.

FIG. 8 illustrates a driving system for vehicles according to implementations of the present disclosure.

In conventional systems, a destination needs to be set for autonomous driving of a vehicle. When a destination is not set, the vehicle cannot autonomously travel.

However, a vehicle may need to start to autonomously travel when a destination is not set. For example, a vehicle needs to start to autonomously travel when a user forcibly instructs the vehicle to start without setting a destination; the vehicle needs to continue to travel because the vehicle cannot stop at a destination; or the user abruptly requests autonomous driving during manual driving without setting a destination.

To solve such a problem, the driving system for vehicles according to implementations of the present disclosure can start autonomous driving even when a destination is not set.

The driving system for vehicles according to implementations of the present disclosure may include an input unit 210, an output unit, a power supply 719, a processor 717 and an interface 713.

The input unit 210 may receive user input applied to the driving system. For example, the input unit 210 can receive user input for requesting autonomous driving or user input for requesting manual driving. The input unit 210 may be electrically connected to the processor 717 and provide received user input to the processor 717.

The input unit 210 and the output unit are included in the vehicle. Alternatively, the driving system for vehicles may include a separate input device or output device.

The power supply 719 may provide power to each unit of the driving system for vehicles.

The interface may deliver data or signals transmitted from an external device to the processor 717. The interface 713 may deliver data or signals transmitted from the processor 717 to an external device. The external device may be a unit included in the vehicle 100 or a device separately connected to the interface 713.

For example, the interface 713 can deliver, to the processor 717, information transmitted from at least one of the controller 170, the user device 200, the object detection device 300, the communication device 400, the maneuvering device 500, the navigation system 770, the sensing unit 120, the interfaces 713 and 130, or the memory 140 included in the vehicle 100.

For example, the interface 713 can be electrically connected to a mobile terminal of a passenger seated in the vehicle 100 and provide information acquired by or pre-stored in the mobile terminal to the processor 717.

The processor 717 may generate a control signal for controlling the Vehicle drive device 600. The processor 717 may provide the control signal to the Vehicle drive device 600 through the interface 713. The processor 717 may control movement of the vehicle 100 by providing the control signal to the Vehicle drive device 600.

The processor 717 may acquire various types of information through the interface 713. For example, the processor 717 can acquire the first information through the interface 713.

The processor 717 may control the vehicle 100 to autonomously travel on the basis of the first information.

The processor 717 may provide a control signal to the Vehicle drive device 600 such that the vehicle autonomously travels upon determining that the vehicle needs to start autonomous driving when there is not preset destination on the basis of user input received through the input unit 210.

The processor 717 may determine whether the vehicle needs to start autonomous driving when there is no preset destination on the basis of user input.

For example, the processor 717 can determine whether there is a preset destination upon reception of user input for requesting autonomous driving of the vehicle. The processor 717 can display a menu for setting a destination on the display 251 of the vehicle upon determining that there is no preset destination. The processor 717 may determine that the vehicle needs to start autonomous driving without a preset destination when a destination is not input for a predetermined time after the menu is displayed or user input for requesting autonomous driving is re-received.

The processor 717 may determine whether the vehicle needs to start autonomous driving without a preset destination on the basis of the first information.

For example, the processor 717 can determine that the vehicle needs to start autonomous driving without a preset destination upon determining that the vehicle cannot stop, no destination is set, and a passenger does not drive the vehicle on the basis of the first information.

The processor 717 may determine whether the vehicle cannot stop on the basis of the first information. For example, the processor 717 can determine whether there is a space around the vehicle in which the vehicle can stop on the basis of surrounding environment information included in the first information. The processor 717 determines that the vehicle cannot stop upon determining that there is no space around the vehicle in which the vehicle can stop. For example, the processor 717 may determine whether the vehicle can enter a space in which the vehicle can stop on the basis of surrounding situation information included in the first information. The processor 717 determines that vehicle cannot stop upon determining that the vehicle cannot enter a space in which the vehicle can stop on the basis of movement of other vehicles and traffic regulations.

The processor 717 may determine whether a destination has been set on the basis of the first information. The processor 717 may acquire information stored in the memory 140 or navigation information provided by the navigation system 770 through the interface 713. The processor 717 may determine whether there is a preset destination of the vehicle on the basis of at least one of the stored information or the navigation information.

The processor 717 may determine whether a passenger does not drive the vehicle on the basis of the first information. In implementations of the present disclosure, cases in which a passenger does not drive include a case in which a passenger does not operate the maneuvering device, a case in which a passenger cannot drive (e.g., a case in which the passenger is a child or does not have a driver's license), a case in which a passenger is in a situation in which they cannot drive (e.g., the passenger is determined to drunk, drowsy or having a medical emergency), and a case in which a passenger does not perform driving corresponding to a surrounding situation (e.g., when user input received by the maneuvering device 500 does not correspond to a surrounding situation).

For example, the processor 717 can determine whether a passenger can drive the vehicle on the basis of passenger information included in the first information. For example, the processor 717 can determine that the passenger does not drive the vehicle upon determining that driver input acquired through the maneuvering device 500 does not correspond to a surrounding situation of the vehicle 100. For example, the processor 717 can determine a driver on the basis of passenger information and determine that the passenger does not drive the vehicle upon determining that the driver does not have a driver's license on the basis of authentication information prestored in the memory or authentication information acquired through the communication device 400.

The processor 717 may determine a time limit and a limited distance on the basis of the first information upon determining that the vehicle needs to start autonomous driving without a preset destination. The processor 717 may set the limited area on the basis of at least one of the time limit or the limited distance.

The time limit is a time value for limiting a time required for autonomous driving to return to a start point after the start of autonomous driving. For example, when the time limit is 30 minutes, the vehicle 100 needs to be located at a point where the vehicle can return to a start point within 30 minutes at any time after autonomous driving is started. An area in which the vehicle 100 can move after autonomous driving is started may be limited by the time limit.

The limited distance is a distance value for limiting a distance between the location of the vehicle and a start point after autonomous driving is started. For example, if the limited distance is 5 km, the vehicle 100 needs to be located within 5 km from the start point. An area in which the vehicle 100 can move after autonomous driving is started may be limited by the limited distance.

The processor 717 may determine the time limit or the limited distance on the basis of the first information.

For example, the processor 717 can determine the time limit or the limited distance on the basis of schedule information included in the first information. The schedule information is information about a schedule of a user. The schedule information may be stored in the memory 140 of the vehicle 100 or transmitted from a mobile terminal of the user. The interface 713 may deliver schedule information stored in the memory 140 to the processor 717. The interface 713 may acquire information about a schedule of the user received through the communication device 400 and deliver the information to the processor 717. The schedule information may include an appointed time and an appointed place of the user.

For example, when schedule information and position information are acquired through the interface 713, the processor 717 can determine the time limit or the limited distance such that the vehicle arrives at an appointed place at a preset appointed time. The processor 717 may determine the appointed time and the appointed place. For example, when the appointed time is 3 p.m. and the appointed place is Gangnam station, the processor 717 can determine the time limit and the limiting time such that the vehicle 100 can arrive at Gangnam station at 3 p.m. When one hour is taken for the vehicle 100 to travel from an autonomous driving start point to Gangnam station and the vehicle 100 starts autonomous driving at 11 a.m., the vehicle 100 needs to return to the start point by at least 2 p.m., the time limit can be 3 hours obtained by subtracting the start time from the time when the vehicle 100 needs to return to the start point. The limited distance can be a distance in which the vehicle 100 can travel and return within three hours.

The limited distance of the time limit may depend on the quantity of fuel of the vehicle 100 or traffic situation. Accordingly, the processor 717 can determine the time limit or the limited distance on the basis of fuel information or traffic information included in the first information. The fuel information indicates the quantity of fuel of the vehicle 100 or the remaining battery charge of the vehicle 100. The traffic information indicates traffic conditions.

For example, when at least one of the fuel information or the traffic information is further acquired through the interface 713, the processor 717 can determine the time limit or the limited distance on the basis of the fuel information and the traffic information. This serves to prevent a situation in which the vehicle 100 cannot arrive at an appointed place due to lack of fuel. The processor 717 may calculate a first quantity of fuel necessary for the vehicle 100 to arrive at an appointed place from the start point on the basis of the fuel information and the traffic information. A second quantity of fuel calculated by subtracting the first quantity of fuel from the current quantity of fuel is the quantity of fuel which can be used for the vehicle 100 before starting to travel to the appointed place. In this case, the limited distance can be determined depending on an area in which the vehicle 100 can travel and return to the start point using the second quantity of fuel.

In addition, upon determining that the quantity of fuel of the vehicle 100 is insufficient to reach an appointed place, the processor 717 may determine a gas station closest to the start point on the basis of navigation information and determine the time limit or the limited distance depending on a time and a distance required for the vehicle to travel to the gas station and then travel to the appointed place.

The processor 717 may determine a time taken for the vehicle 100 to travel a specific route on the basis of traffic information. Accordingly, the processor 717 can determine a time taken for the vehicle 100 to autonomously travel and then return to the start point or a distance which the vehicle 100 can travel and then return within the time limit. The processor 717 can determine the distance which the vehicle can travel and then return within the time limit as the limited distance.

For example, the processor 717 can determine the time limit or the limited distance on the basis of information about the current time included in the first information. For example, the processor 717 can determine a time limit and a limited distance when the current time is between 08:00 and 24:00 to be shorter than a time limit and a limited distance when the current time is between 09:00 and 15:00.

The limited area may be an area determined by the limited distance or the time limit. The limited area is an area in which the vehicle 100 can travel depending on the limited distance or the time limit. The processor 717 can set a limited area on the basis of at least one of the time limit or the limited distance.

The processor 717 may set a limited area such that a time taken for the vehicle to return from a point in the limited area to the start point is within the time limit.

The processor 717 may set a limited area such that a distance between a point in the limited area and the start point is within the limited distance. Accordingly, the vehicle 100 can return to the start point within the time limit irrespective of a point at which the vehicle 100 is located in the limited area. The vehicle 100 can be located within the limited distance from the start point irrespective of a point at which the vehicle 100 is positioned in the limited area.

The processor 717 may provide a control signal such that the vehicle autonomously travels within a limited area. The control signal provided by the processor 717 is delivered to the Vehicle drive device 600. The Vehicle drive device 600 operates on the basis of the control signal. Accordingly, the vehicle 100 autonomously travels within the limited area and does not escape from the limited area.

The processor 717 may determine one or more recommended points of interest (POIs) corresponding to a driving situation of the vehicle on the basis of POI information and the first information acquired through the interface 713.

The POI information may include at least one of search history information or navigation information.

The search history information is information about web search performed through a mobile terminal or the user interface device 200. For example, the search history information may include information about a searched space, a person who performs search, a search time, a position at which search is performed, the number of searches per place, etc.

When a user searches for a specific place using a mobile terminal, search history information can be stored in a memory of the mobile terminal. The processor 717 can acquire the search history information stored in the mobile terminal through the communication device 400.

When the user searches for a specific place through the user interface device 200, search history information can be stored in the memory 140. The processor 717 can acquire the search history information stored in the memory 140.

The processor 717 may determine at least one POI on the basis of search history information. In this case, the POI may include a place that the user has searched for one or more times, a place directly set by the user as a POI, a place that the user has visited one or more times, and a place related to an SNS notice of the user. In this case, the POI is a specific place determined to be preferred by the user.

The processor 717 may determine at last one POI on the basis of navigation information. The navigation information may include information about a POI on the web. For example, a POI on the web may be a place searched for on the web a predetermined number of times or more or a place mentioned in a web notice a predetermined number of times or more. The navigation system 770 may receive information about POI existing on the web and include the same in navigation information. In this case, the POI is a specific place determined to be preferred by unspecified individuals.

The processor 717 may determine a POI corresponding to a vehicle driving situation among one or more POI determined on the basis of POI information to be a recommended POI. The processor 717 may determine a recommended POI on the basis of the POI information and the first information.

A driving situation of the vehicle may be information related to a vehicle, driving, a surrounding environment and a passenger and determined by the processor 717 on the basis of the first information.

For example, a driving situation of the vehicle may be information about the current location of the vehicle, the current time, a state of the vehicle (e.g., the quantity of fuel, malfunction of a specific part, a speed, etc.), a passenger (e.g., identification and the number of passengers), a state of a passenger (e.g., drowsiness, emergency or emotion) and a driving time.

The fact that a POI corresponds to a driving situation of the vehicle means that the type of place of the POI corresponds to a driving situation of the vehicle.

The type of place represents the type of a place. For example, the type of place may be a restaurant, a gas station, a school, a hospital, an office, a house, a shopping mall, a theater, a hotel, a historic site, a subway station or the like. The processor 717 may determine the type of place of a specific POI on the basis of metadata included in POI information.

The processor 717 may determine the type of place corresponding to a driving situation of the vehicle according to a predetermined determination criterion. The predetermined determination criterion may be stored in the memory.

For example, the processor 717 can determine the type of place corresponding to a driving situation of the vehicle on the basis of at least one of the location of the vehicle, a state of the vehicle, a passenger, a state of a passenger or a driving time.

For example, the processor 717 can determine that the type of place corresponding to a driving situation of the vehicle is a gas station upon determining that the vehicle has insufficient fuel. The processor 717 can determine that the quantity of fuel is insufficient when the quantity of fuel is less than a predetermined amount.

For example, the processor 717 can determine that the type of place corresponding to a driving situation of the vehicle is a car center or a service center upon determining that one or more parts of the vehicle are out of order or need to be checked.

For example, the processor 717 can determine that the type of place corresponding to a driving situation of the vehicle is a hospital upon determining that at least one passenger is having a medical emergency on the basis of passenger information. For example, the processor 717 can determine that at least one passenger is having a medical emergency when there is a passenger whose body temperature is equal to or higher than a set value or whose pulse is out of a set range.

For example, the processor 717 can determine that the type of place corresponding to a driving situation of the vehicle is a rest area upon determining that the vehicle is in the manual mode and a driver is drowsy on the basis of passenger information and vehicle state information. For example, the processor 717 can determine whether the driver is drowsy on the basis of an image of the driver captured by the internal camera 220.

For example, the processor 717 can determine that the type of place corresponding to a driving situation of the vehicle is a restaurant upon determining that a driving time corresponds to a meal time. A meal time may be a time value within a predetermined range.

For example, the processor 717 can determine that the type of place corresponding to a driving situation of the vehicle is a theater or a shopping mall upon determining that a driving date is a holiday and a driving time is not a meal time.

For example, the processor 717 can determine that the type of place corresponding to a driving situation of the vehicle is a hotel upon determining that the current time is after 24:00.

For example, the processor 717 can determine that the type of place corresponding to a driving situation of the vehicle is a theme park upon determining that an adult and a child are passengers on the basis of passenger information.

For example, the processor 717 can determine that the type of place corresponding to a driving situation of the vehicle is a driving route upon determining that passengers are a man and a woman on the basis of passenger information.

The processor 717 may determine one or more POI corresponding to the type of place determined to correspond to a driving situation of the vehicle as a recommended POI.

For example, when the processor 717 can determine a POI whose type of place corresponding to a driving situation of the vehicle is a gas station from among points of interest determined on the basis of POI information as a recommended POI.

For example, when the processor 717 can determine a POI whose type of place corresponding to a driving situation of the vehicle is a restaurant from among points of interest determined on the basis of POI information as a recommended POI.

For example, when the processor 717 can determine a POI whose type of place corresponding to a driving situation of the vehicle is a hospital from among points of interest determined on the basis of POI information as a recommended POI.

For example, when the processor 717 can determine a POI whose type of place corresponding to a driving situation of the vehicle is a hotel from among points of interest determined on the basis of POI information as a recommended POI.

The processor 717 may determine that a POI corresponding to a determined type of place on the basis of POI information is not a recommended POI.

For example, the processor 717 can determine that a POI corresponding to the determined type of place is not a recommended POI when the place corresponding to the POI is at a set distance or longer from the current location of the vehicle.

For example, the processor 717 can determine that a POI corresponding to the determined type of place is not a recommended POI upon determining that the place corresponding to the POI is not open for business on the basis of business hours and the current time.

The processor 717 may provide a control signal such that the vehicle passes through a point within a limited area among at least one POI. Accordingly, the vehicle can pass through a recommended POI located within the limited area.

The processor 717 may display a menu for setting one of one or more recommended POIs as a destination to the display 251 of the vehicle.

The processor 717 may set a recommended POI selected on the basis of user input corresponding to a menu item as a destination. The processor 717 may provide a control signal such that the vehicle travels to the recommended POI set as a destination.

When there are multiple recommended POIs in a limited area, the processor 717 may generate an optimized path passing through the multiple recommended POIs. For example, the optimized path may be a shortest path through the multiple recommended POIs. As another example, the optimized path may be a path with shortest travel time through the multiple recommended POIs.

The processor 717 may provide a control signal such that the vehicle travels along the generated optimized path.

The processor 717 may generate a path passing through the multiple recommended POIs located within the limited area on the basis of traffic conditions determined on the basis of navigation information. In this case, a path which can pass through the multiple recommended POIs most rapidly according to traffic conditions may be the optimized path passing through the multiple recommended POIs, even if the path is not the shortest path.

The processor 717 may determine user preference for one or more recommended POIs on the basis of POI information.

The processor 717 may determine the user preference depending on the number of times that the user has searched for a specific POI, the number of times that the user has actually visited the specific POI, the number of times that the specific POI has been registered with SNS, whether the contact or location of the specific POI is stored, whether the POI is registered as a bookmark, and a degree of interest directly input by the user, which are determined on the basis of POI information.

For example, the processor 717 can determine that user preference for the corresponding POI is higher as the number of times the user searches for the POI, the number of times the user actually visits the POI and the number of times the POI is registered with SNS is larger.

For example, the processor 717 can determine that user preference for the corresponding POI is high when the contact or location of the POI is stored.

For example, the processor 717 can determine that user preference for the corresponding POI is high when the POI is registered as a bookmark.

For example, the processor 717 can determine user preference for a specific POI on the basis of a degree of interest directly input by the user for the POI.

The processor 717 may calculate user preference for a specific POI as a specific score upon synthetic judgment of the aforementioned criteria of determination. For example, the processor 717 can determine user preference for a specific POI as 86 out of 100.

The processor 717 may display an image representing user preference on the display 251 of the vehicle. For example, an image representing user preference may be an image of one or more stars arranged in one direction. For example, the image representing user preference may be numerals indicating a score.

The processor 717 may provide a control signal such that the vehicle sequentially passes through one or more recommended POIs located in a limited area in the order of determined user preference.

The processor 717 may provide a control signal such that the vehicle travels to a predetermined return point upon determining that the vehicle has passed through all points located with the limited area from among one or more recommended POIs. For example the predetermined return point may be a place set to the house of the user.

The interface 713 may receive a signal provided by the maneuvering device 500 of the vehicle. When a signal provided by the maneuvering device 500 is received, the processor 717 may modify a limited area upon determining that the vehicle 100 is located within a set distance from the boundary of the limited area. For example, the limited area can be expanded to include additional region beyond the boundary of the initial limited area. As another example, the limited area can be shifted toward the current location of the vehicle.

The set distance may be a value set by the user. For example, the set distance may be 300 m. In this case, when the vehicle 100 is located within 300 m from the boundary of the limited area and a passenger operates the maneuvering device of the vehicle 100, e.g., the steering wheel of the vehicle 100, then the limited area can be extended and thus the vehicle can travel beyond the previous limited area.

When a destination setting signal transmitted from a device provided in the vehicle is received through the interface 713 while the vehicle 100 autonomously travels without a set destination, the processor 717 may set a destination of the vehicle 100 on the basis of the destination setting signal. Example of the device include a predetermined mobile terminal.

The destination setting signal is a signal transmitted to the vehicle 100 from a predetermined mobile terminal when the user sets a destination of the vehicle 100 using the mobile terminal. The destination setting signal includes information about destinations input by the user. Accordingly, the user can set a destination using a mobile terminal interoperating with the vehicle through communication.

The predetermined mobile terminal may generate the destination setting signal on the basis of user input and transmit the destination setting signal to the vehicle 100. When the destination setting signal is received by the communication device 400, the processor 717 may acquire the received destination setting signal through the interface 713. The processor 717 may set a destination of the vehicle 100 on the basis of the acquired destination setting signal.

The processor 717 may transmit a signal for requesting destination setting to a predetermined mobile terminal upon determining that a predetermined passenger has entered the vehicle 100 on the basis of passenger information.

For example, the processor 717 can transmit the destination setting request signal to a mobile terminal of a predetermined guardian upon determining that a passenger of the vehicle 100 is a child on the basis of passenger information. The processor 717 can set a destination of the vehicle 100 on the basis of a destination setting signal received from the mobile terminal of the predetermined guardian.

The processor 717 may transmit the destination setting request signal to a mobile terminal set by the user on the basis of user input. The processor 717 may set a destination of the vehicle 100 on the basis of a destination setting signal transmitted from the mobile terminal.

The processor 717 may set a past destination corresponding to a driving situation of the vehicle as a destination on the basis of driving history data and the first information upon determining that the vehicle needs to start autonomous driving when there is no preset destination. The processor 717 may provide a control signal such that the vehicle autonomously travels to the set destination.

The driving history data is information indicating a history related to past driving of the vehicle. For example, the driving history data can include information about previously set destinations, arrival locations of the vehicle, time related to past driving (e.g., start time, driving time and arrival time), start points of the vehicle, passengers who was mounted in the vehicle, past routes of the vehicle, stoppage time, past driving routes, etc.

The processor 717 may determine a state of the vehicle, a state of a passenger, a set destination, a start point, starting time, driving time, a stop point, a stoppage time, a surrounding situation, etc. on the basis of the first information while the vehicle 100 travels and stores the determination result in the memory 140 or transmit the same to a predetermined terminal as driving history data.

The processor 717 may acquire driving history data stored in the memory 140 or acquire driving history data of the vehicle 100 transmitted from a predetermined mobile terminal or server. Driving history data stored in the memory 140 or driving history data received by the communication device 400 may be delivered to the processor 7171 through the interface 713.

A past destination corresponding to a driving situation of the vehicle may be a place set as a destination of the vehicle 100 in a past driving situation determined to be closest to the current driving situation of the vehicle 100 through comparison between the current driving situation and past various driving situations.

A place set as a destination of the vehicle 100 in a past driving situation may be called a past destination corresponding to the past driving situation.

The processor 717 may determine a matching rate between a driving situation of the vehicle determined on the basis of information provided by various units of the vehicle and each of one or more past driving situations determined on the basis of driving history data in order to detect a past driving situation closest to the current driving situation from past driving situations. For example, when there are 10 past driving situations determined on the basis of driving history data, the processor 717 can determine a matching rate between the current driving situation and each of the 10 past driving situations.

A matching rate indicates a degree to which two situations correspond to each other.

For example, the processor 717 can determine a matching rate between a driving situation of the vehicle and each of one or more past driving situations on the basis of at least one of a state of the vehicle 100, a passenger, a state of the passenger, a start point, driving time or a driving route. A state of the vehicle 100, a passenger, a state of the passenger, a start point, driving time and a driving route may be called matching rate determination criteria.

For example, the processor 717 can determine a matching rate by comparing the current state of the vehicle 100 with a state of the vehicle 100 in a past driving situation. States of the vehicle may include the quantity of fuel of the vehicle 100, a part determined to be out of order, a part that needs to be checked, states of supplies, etc.

For example, the processor 717 can determine a matching rate by comparing a current passenger with a passenger in a past driving situation. In this case, a passenger may include identification of the passenger, the number of passengers, etc. For example, when multiple passengers currently seated in the vehicle 100 are the same as multiple passengers seated in the vehicle 100 in a past driving situation, the processor 717 can determine a matching rate of 100% on the basis of the passengers.

For example, the processor 717 can determine a matching rate by comparing a current state of a passenger with a state of the passenger in a past driving situation. In this case, a state of a passenger may include an emergency state, a drowsy state, a depressed state, a joyful state, etc.

For example, the processor 717 can determine a matching rate by comparing the current start point of the vehicle 100 with a start point of the vehicle in a past driving situation.

For example, the processor 717 can determine a matching rate by comparing the current time when a passenger gets in the vehicle with a time when the passenger gets in the vehicle 100 in a past driving situation.

For example, the processor 717 can determine a matching rate by determining a degree to which a route through which the vehicle 100 has traveled so far from a start point is consistent with a route through which the vehicle traveled in a past driving situation.

The processor 717 may compare a current driving situation of the vehicle with each of one or more past driving situations according to one or more matching rate determination criteria.

For example, the processor 717 can determine a matching rate by determining a similarity in weather (e.g., temperature, precipitation) of current and past driving situations.

For example, the processor 717 can determine a matching rate by determining a similarity in month, week, or day of current and past driving situations.

Various matching methods, such as fuzzy matching, neural networks, and machine learning may be used to determine the matching rate.

The processor 717 may calculate a matching rate between the current driving situation of the vehicle and each of one or more past driving situations according to each determination criterion. The processor 717 may determine a final matching rate by calculating the average of matching rates according to respective determination criteria.

The processor 717 may assign different weights to determination criteria in calculation of averages of matching rates according to the determination criteria. For example, the processor 717 can assign a highest weight to a determination criterion corresponding to a passenger. In this case, a final matching rate can be calculated as a high value when a matching rate according to the determination criterion corresponding to the passenger is high even if matching rates according to other determination criteria are relatively low.

The processor 717 may determine a past destination corresponding to a matching rate equal to or higher than a set value from among one or more past driving situations as a recommended destination. The set value is a reference value for determining a past driving situation similar to the current driving situation. The set value may be stored in the memory 140. The set value may be changed by the user. For example, the set value can be 80%. In this case, the processor 717 can determine a destination corresponding to a past driving situation having a matching rate equal to or higher than 80% with the current driving situation as a recommended destination.

A past destination corresponding to a past driving situation refers to a place set as a destination of the vehicle 100 in the past driving situation.

When there is one recommended destination, the processor 717 may set the recommended destination as a destination of the vehicle.

When there are multiple recommended destinations, the processor 717 may display a menu for selecting one of the multiple recommended destinations on the display 251 of the vehicle.

The processor 717 may set a recommended destination selected on the basis of user input corresponding to a menu item as a destination of the vehicle. In this case, the user input corresponding to a menu item is an input for selecting one of the multiple recommended destinations. The processor 717 may set the selected recommended destination as a destination of the vehicle 100 on the basis of the input for selecting one of the multiple recommended destinations.

The processor 717 may provide a control signal to the Vehicle drive device 600 to control the vehicle 100 to autonomously travel to the set destination.

According to another implementation, the processor 717 may determine a past destination corresponding to a highest matching rate from among one or more past driving situations as a recommended destination.

The processor 717 may determine one or more recommended POIs corresponding to a driving situation of the vehicle on the basis of POI information acquired through the interface 713 and display an image corresponding to the one or more recommended POIs on the display 251 of the vehicle.

For example, the image corresponding to the recommended POIs may be text or an image indicating the recommended POIs.

For example, the image corresponding to the recommended POIs may be a map image on which the recommended POIs are indicated.

For example, the image corresponding to the recommended POIs may be a map image indicating routes through which the vehicle will arrive at the recommended POIs.

For example, the image corresponding to the recommended POIs may be a message box in which the recommended POIs are described.

Accordingly, the user can recognize a place corresponding to the current driving situation during autonomous driving of the vehicle 100.

The processor 717 may display a menu for setting one of the one or more recommended POIs as a destination on the display 251 of the vehicle. The processor 717 may set a recommended POI selected on the basis of user input corresponding to a menu item as a destination.

Upon determining that the vehicle needs to start autonomous driving while a destination is not set on the basis of user input or the first information during manual driving of the vehicle, the processor 717 may set a past destination corresponding to a manual driving route and a start time of the vehicle as a destination on the basis of driving history data.

The processor 717 determines whether there is a preset destination upon determining that the driver cannot drive the vehicle, the driver does not drive the vehicle or the driver requests autonomous driving during manual driving of the vehicle on the basis of user input or the first information. The processor 717 may determine that the vehicle needs to start autonomous driving without a preset destination when there is no present destination.

The processor 717 may determine whether past driving situations include a past driving route corresponding to or similar to the current manual driving route of the vehicle 100 on the basis of driving history data. The processor 717 may compare past driving routes with the current manual driving route of the vehicle 100 and determine a past driving route closest to the current manual driving route of the vehicle 100. The processor 717 may detect a destination which was set when the vehicle 100 traveled along the past driving route closest to the current manual driving route of the vehicle 100 on the basis of the driving history data. The processor 717 may determine the destination which was set when the vehicle 100 traveled along the past driving route closest to the current manual driving route of the vehicle 100 as a past destination corresponding to the manual driving route of the vehicle 100.

The processor 717 may determine whether past driving situations include a past start time similar to the current start time of the vehicle 100. The processor 717 may compare past start times with the current start time of the vehicle 100 and determine a past start time closest to the current start time of the vehicle 100. The processor 717 may determine a destination which was set at the past start time closest to the current start time of the vehicle 100 as a past destination corresponding to the start time.

Upon determining that the driver is in a preset state in which the driver cannot drive during manual driving of the vehicle on the basis of passenger information included in the first information, the processor 717 may set a place corresponding to the state in which the driver cannot drive as a destination of the vehicle.

The preset state in which the driver cannot drive is a state in which the driver is determined to be having an emergency, to be drowsy or to be drunk. The processor 717 may determine whether the driver is having an emergency, is drowsy or is drunk on the basis of the passenger information.

A place corresponding to the state in which the driver cannot drive is a place of a type predetermined according to the type of the state in which the driver cannot drive.

For example, when the driver is having a medical emergency, the place corresponding to the state in which the driver cannot drive may be a hospital. The processor 717 can set a hospital within a predetermined distance from the vehicle 100 as a destination of the vehicle 100 upon determining that the driver is having a medical emergency.

For example, when the driver is drowsy, the place corresponding to the state in which the driver cannot drive may be a rest area. The processor 717 can set a rest area closest to the vehicle 100 as a destination of the vehicle 100 upon determining that the driver is drowsy.

For example, when the driver is drunk, the place corresponding to the state in which the driver cannot drive may be the house of the driver. The processor 717 can set the house closest as a destination of the vehicle 100 upon determining that the driver is drunk.

According to another implementation, the processor 717 may display a menu for inputting a destination on the display 251 and provide a control signal to control the vehicle 100 to maintain the manual mode until a destination is input when user input for requesting autonomous driving when there is no preset destination is received.

According to another implementation, the processor 717 may set the start point as the next destination on the basis of driving history data after the vehicle 100 arrives at a set destination. For example, upon determining that there are multiple past driving situations in which the start point of the vehicle was set as a destination after the vehicle 100 arrived at a first place on the basis of driving history data, the processor 717 may set the start point as the next destination when the vehicle 100 arrives at the first place.

According to another implementation, when the vehicle passes through multiple recommended POIs, the processor 717 may control the vehicle 100 to travel to a recommended POI closest to the current location thereof, and when the vehicle 100 arrives at the recommended POI, set the closest recommended POI other than the recommended POI at which the vehicle 100 is located as the next destination.

According to another implementation, when the vehicle passes through multiple recommended POIs, the processor 717 may generate a first route which passes through the multiple recommended POIs. When the first route is generated, the processor 717 may exclude sections determined to be areas having a traffic jam or highway on-ramps from the first route.

According to another implementation, when the vehicle 100 manually travels while a destination thereof has been set, the processor 717 may generate a second route through which the vehicle 200 arrives at the set destination. The processor 717 may cancel the set destination upon determining that the number of times that the vehicle 100 deviates from the second route is equal to or greater than a set number of times. The processor 717 may display the menu for inputting a destination on the display 251 when the set destination is cancelled.

Figure 9:
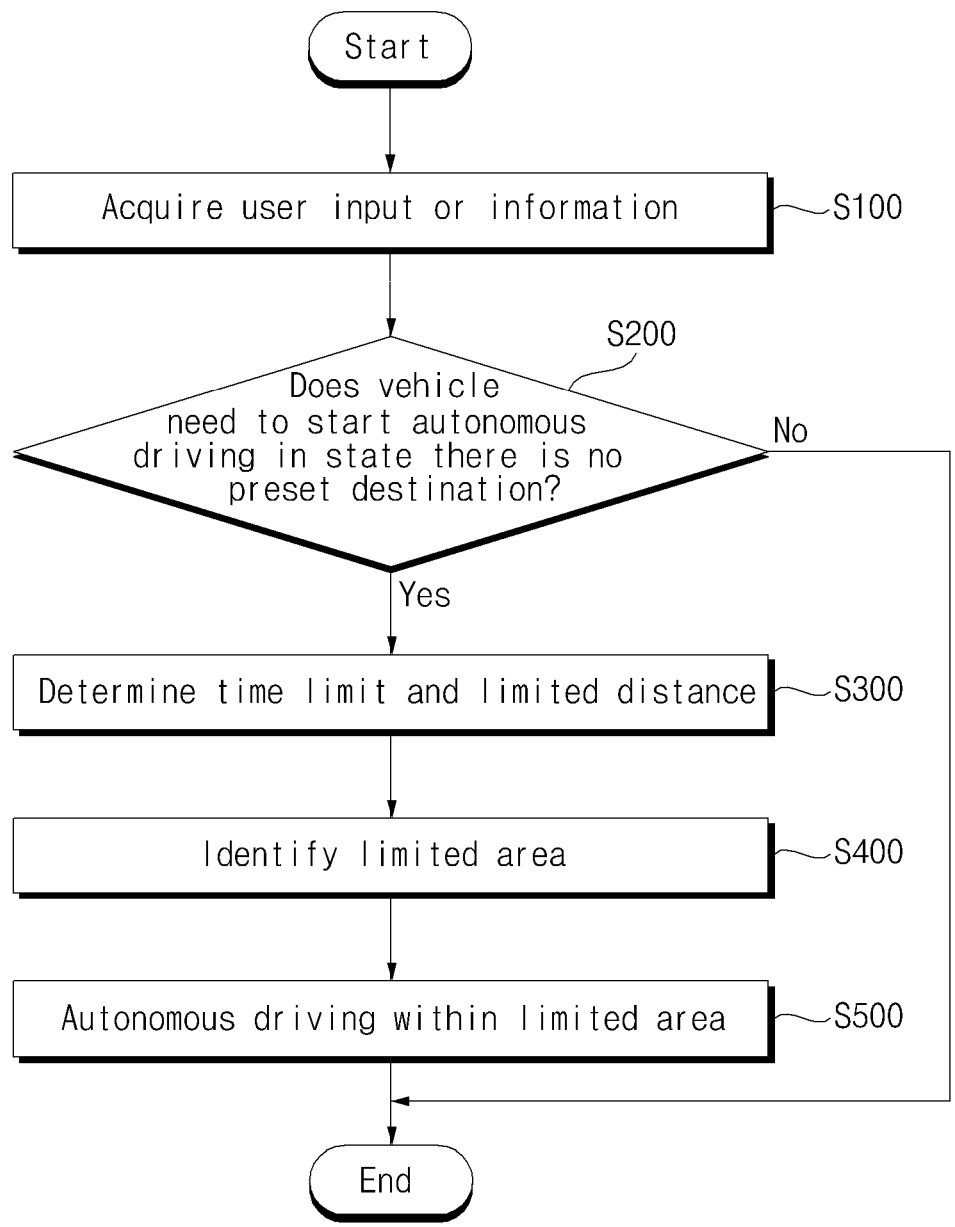
FIG. 9 is a flowchart of an example method for autonomous driving of the vehicle within a limited area in absence of a set destination.

FIG. 9 is a flowchart of an example method for autonomous driving of the vehicle within a limited area in absence of a set destination.

The processor 717 may acquire at least one of user input or the first information through the interface 713 (S100).

The processor 177 may determine whether the vehicle 100 needs to start autonomous driving when a destination has not been preset on the basis of the user input or the first information (S200).

The processor 717 may determine whether the vehicle 100 needs to start autonomous driving when a destination has not been preset on the basis of user input.

For example, the processor 717 can determine whether there is a preset destination upon reception of user input for requesting autonomous driving of the vehicle.

The processor 717 may display a menu for setting a destination on the display 251 of the vehicle upon determining that there is no preset destination. The processor 717 may determine that the vehicle needs to start autonomous driving while a destination has not been preset when a destination is not input for a set period of time or user input for requesting autonomous driving is re-received.

The processor 717 may determine whether the vehicle needs to start autonomous driving when a destination has not been preset on the basis of the first information.

For example, the processor 717 can determine that the vehicle needs to start autonomous driving when a destination has not been preset upon determining that the vehicle cannot stop, there is no preset destination and a passenger does not drive the vehicle on the basis of the first information.

The processor 717 may determine a time limit and a limited distance on the basis of the first information upon determining that the vehicle needs to start autonomous driving when a destination has not been preset (S300).

The processor 717 may determine the time limit or the limited distance on the basis of the first information.

For example, the processor 717 can determine the time limit or the limited distance on the basis of schedule information included in the first information. The schedule information is information about a schedule of a user. The schedule information may be stored in the memory 140 of the vehicle 100 or transmitted from a mobile terminal of the user. The interface 713 may deliver the schedule information stored in the memory 140 to the processor 717. The interface 713 may acquire information about a schedule of the user received through the communication device 400 and deliver the information to the processor 717. The schedule information may include information about an appointed time and an appointed place of the user.

For example, when the processor 717 acquires scheduling information and position information through the interface 713, the processor 717 may determine a time limit and a limited distance on the basis of the schedule information and the position information such that the vehicle arrives at the appointed place at the appointed time. The processor 717 may determine an appointed time and an appointed place on the basis of schedule information. For example, the appointed time is 15:00 and the appointed place is Gangnam station, the processor 717 can determine the time limit and the limiting time such that the vehicle 100 can arrive at Gangnam station at 15:00. When one hour is taken for the vehicle 100 to travel from an autonomous driving start point to Gangnam station and the vehicle 100 starts autonomous driving at 11:00, the vehicle 100 needs to return to the start point by at least 14:00 and thus the time limit can be obtained as 3 hours by subtracting the start time from the time when the vehicle 100 needs to return to the start point. The limited distance can be a distance which the vehicle 100 can travel and return within three hours.

The processor 717 may set a limited area on the basis of at least one of the time limit or the limited distance (S400).

The limited area may be an area determined by the limited distance or the time limit. The limited area is an area in which the vehicle 100 can travel depending on the limited distance or the time limit. The processor 717 can set a limited area on the basis of at least one of the time limit or the limited distance.

The processor 717 may provide a control signal to control the vehicle to autonomously travel within the limited area (S500).

The control signal provided by the processor 717 is delivered to the Vehicle drive device 600. The Vehicle drive device 600 operates on the basis of the control signal.

Accordingly, the vehicle 100 autonomously travels within the limited area and does not move to the outside of the limited area.

Figure 10:
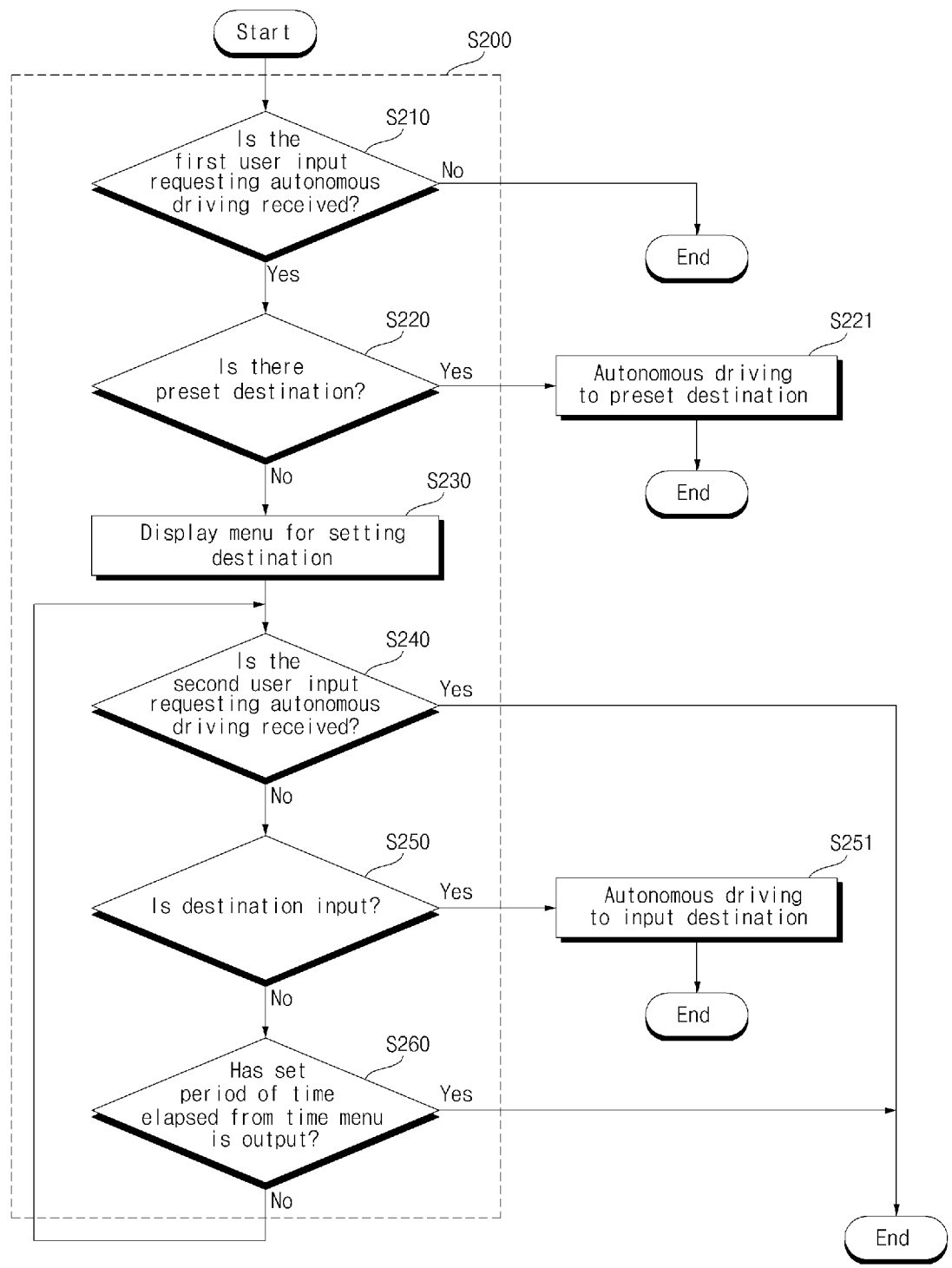
FIG. 10 is a flowchart of an example method for determining, based on a user input, whether to perform autonomous driving in absence of a set destination.

FIG. 10 is a flowchart of an example method for determining, based on a user input, whether to perform autonomous driving in absence of a set destination.

The processor 717 may determine whether user input for requesting autonomous driving is received (S210).

The processor 717 may acquire user input applied to the input unit 210 through the interface 713.

The processor 717 may determine whether the user input requests autonomous driving upon acquisition of the user input.

The processor 717 may determine whether there is a preset destination when the user input for requesting autonomous driving is acquired (S220).

When there is a preset destination, the processor 717 may control the vehicle 100 to autonomously travel to the preset destination (S221).

The processor 717 may display a menu for setting a destination on the display 251 of the vehicle upon determining that there is no preset destination (S230).

The processor 717 may determine whether user input for requesting autonomous driving is re-received (S240).

The processor 717 may determine whether user input for setting a destination through the menu is received (S250).

Upon reception of user input for setting a destination through the menu, the processor 717 may control the vehicle 100 to autonomously travel to the input destination (S251).

The processor 717 may determine whether a set time elapses from the menu display time when user input for setting a destination through the menu is not received (S260).

The processor 717 may determine that the vehicle needs to start autonomous driving while a destination has not been preset when a destination is not input for the set time or user input for requesting autonomous driving is re-received.

Steps S240, S250 and S260 may be simultaneously performed or performed in a different order from that shown in the figure.

The processor 717 may determine a time limit and a limited distance on the basis of the first information upon determining that the vehicle needs to start autonomous driving while a destination has not been preset (S300).

Figure 11:
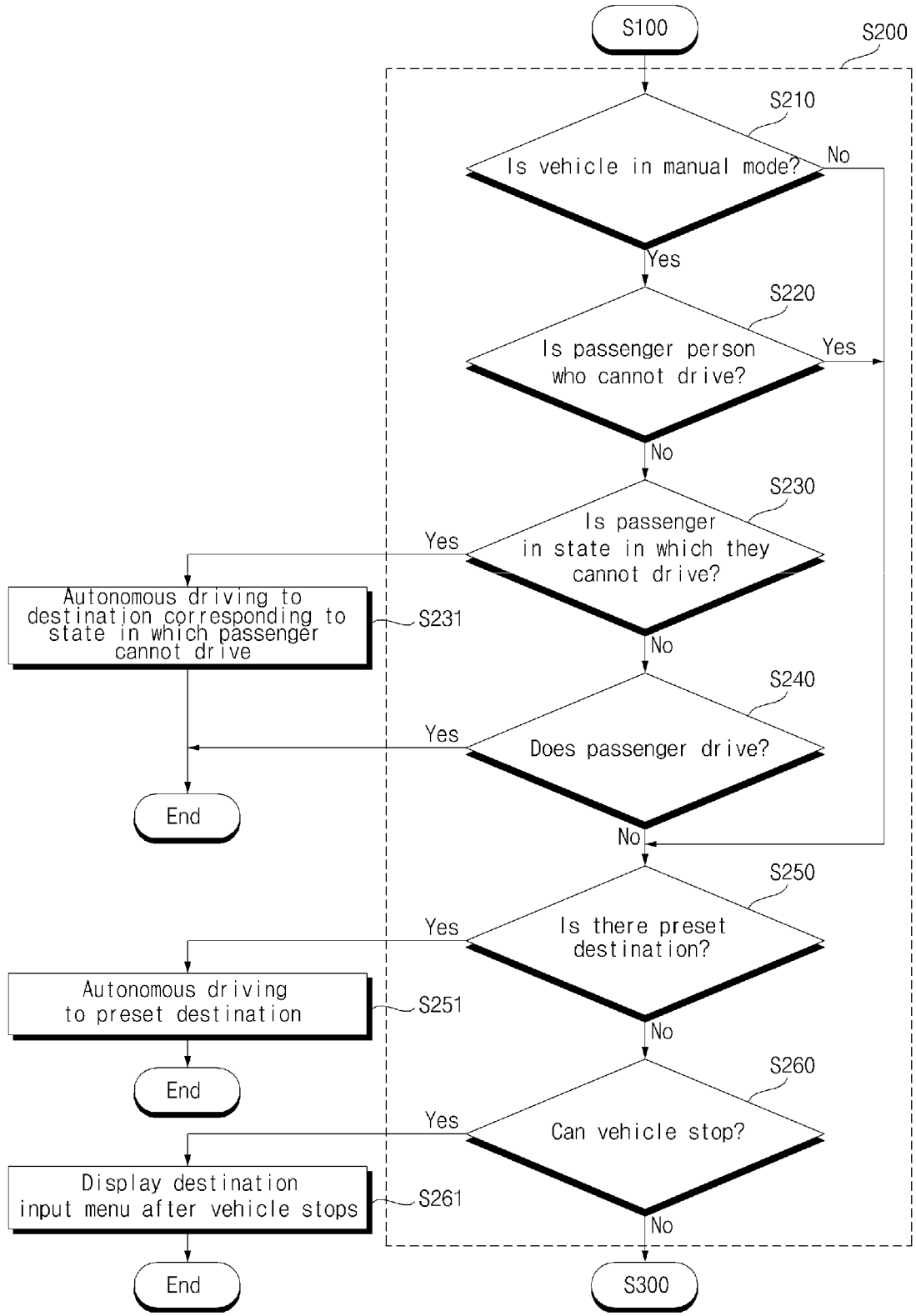
FIG. 11 is a flowchart of an example method for determining, based on first information, whether to perform autonomous driving in absence of a set destination.

FIG. 11 is a flowchart of an example method for determining, based on first information, whether to perform autonomous driving in absence of a set destination.

The processor 717 may determine whether the vehicle 100 is in the manual mode on the basis of vehicle state information included in the first information (S210).

The processor 717 may determine whether a passenger cannot drive the vehicle upon determining that the vehicle 100 is in the manual mode (S220).

For example, the processor 717 can determine that the passenger cannot drive the vehicle upon determining that the passenger is a minor on the basis of passenger information.

For example, the processor 717 can determine whether the passenger has a driver's license on the basis of authentication information stored in the memory 140 or transmitted from a predetermined mobile terminal. The processor 717 may determine that the passenger cannot drive the vehicle upon determining that the passenger have no driver's license.

The processor 717 may determine whether the passenger is in a preset state in which the passenger cannot drive the vehicle on the basis of passenger information included in the first information upon determining that the passenger can drive the vehicle (S230).

The preset state in which the passenger cannot drive is a state in which a driver is determined to be having an emergency, to be drowsy or to be drunk. The processor 717 may determine whether the driver is having an emergency, is drowsy or is drunk on the basis of the passenger information.

The processor 717 may set a place corresponding to the state in which the driver cannot drive as a destination of the vehicle upon determining that the passenger is in the state in which the passenger cannot drive on the basis of the passenger information included in the first information (S231).

A place corresponding to the state in which the driver cannot drive is a place of a type predetermined according to the type of the state in which the driver cannot drive.

For example, when the driver is having a medical emergency, the place corresponding to the state in which the driver cannot drive may be a hospital. The processor 717 can set a hospital within a predetermined distance from the vehicle 100 as a destination of the vehicle 100 upon determining that the driver is having a medical emergency.

For example, when the driver is drowsy, the place corresponding to the state in which the driver cannot drive may be a rest area. The processor 717 can set a rest area closest to the vehicle 100 as a destination of the vehicle 100 upon determining that the driver is drowsy.

For example, when the driver is drunk, the place corresponding to the state in which the driver cannot drive may be the house of the driver. The processor 717 can set the house as a destination of the vehicle 100 upon determining that the driver is drunk.

The processor 717 may determine whether the passenger drives the vehicle upon determining that the passenger is not in the preset state in which the passenger cannot drive (S240).

The processor 717 may determine that the passenger drives the vehicle upon reception of user input corresponding to a surrounding situation of the vehicle 100 through the maneuvering device 500.

The processor 717 may determine that the passenger does not drive the vehicle upon determining that user input received through the maneuvering device 500 does not correspond to a surrounding situation of the vehicle 100 determined on the basis of the first information.

The processor 717 may determine whether there is a preset destination when the vehicle 100 is not in the manual mode (S210), the passenger cannot drive the vehicle (S220), or the passenger does not drive (S2540).

Upon determining that there is a preset destination, the processor 717 may control the vehicle 100 to autonomously travel to the preset destination (S251).

The processor 717 may determine whether the vehicle 100 can stop on the basis of surrounding situation information included in the first information upon determining that there is no preset destination (S260).

The processor 717 may determine that the vehicle 100 can stop upon determining that there is a space in which the vehicle 100 can stop and the vehicle 100 can enter the space on the basis of the surrounding situation information.

The processor 717 may control the vehicle 100 to stop in the space and display the menu for inputting a destination on the display 251 upon determining that the vehicle 100 can stop (S261).

Upon determining that the vehicle 100 cannot stop, the processor 717 may determine that the vehicle needs to start autonomous driving while a destination has not been preset and determine a time limit and a limited distance on the basis of the first information (S300).

Figure 12:
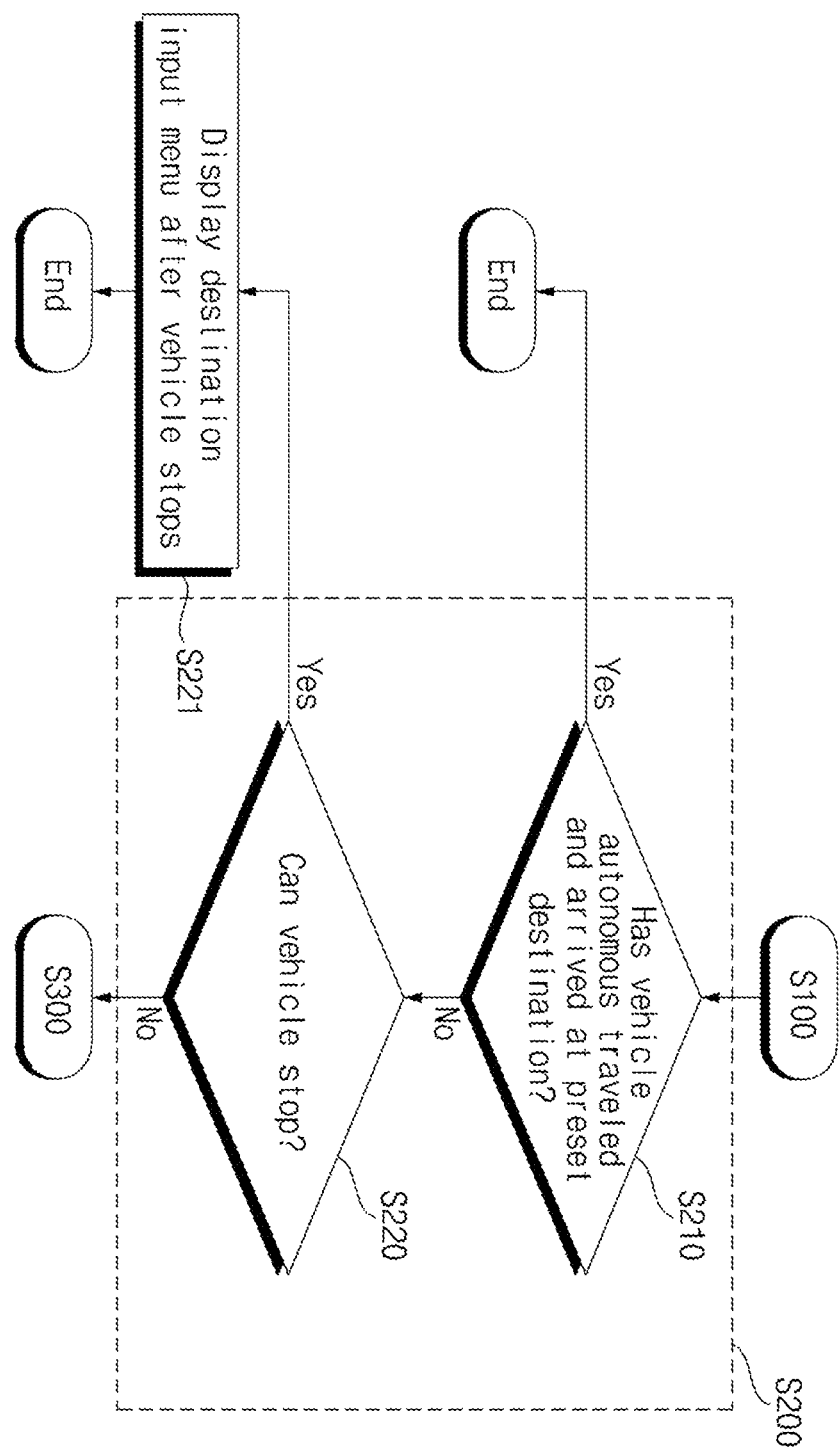
FIG. 12 is a flowchart of an example method for determining whether autonomous driving in absence of a set destination is to be performed when arriving at a destination where the vehicle cannot stop.

FIG. 12 is a flowchart of an example method for determining whether autonomous driving in absence of a set destination is to be performed when arriving at a destination where the vehicle cannot stop.

A destination where the vehicle cannot stop may be, for example, a location where the vehicle is not permitted to idle. As another example, the destination where the vehicle cannot stop may be a location without available parking spaces.

The processor 717 may determine whether the vehicle 100 autonomously travels to arrive at a preset destination on the basis of the first information (S210).

The processor 717 may determine whether the vehicle 100 can stop on the basis of surrounding situation information included in the first information upon determining that the vehicle 100 has arrived at the preset destination (S220).

The processor 7171 can determine that the vehicle 100 can stop upon determining that there is a space where the vehicle 100 can stop and the vehicle 100 can enter the space on the basis of the surrounding situation information.

The processor 717 may control the vehicle 100 to stop in the space and display the menu for inputting a destination on the display 251 upon determining that the vehicle 100 can stop (S221).

Upon determining that the vehicle 100 cannot stop, the processor 717 may determine a time limit and a limited distance on the basis of the first information upon determining that the vehicle needs to start autonomous driving while a destination has not been present and (S300).

When there is no space in which the vehicle 100 can stop although the vehicle 100 has autonomously traveled and arrived at a preset destination, the vehicle 100 needs to continue autonomous driving.

Figure 13:
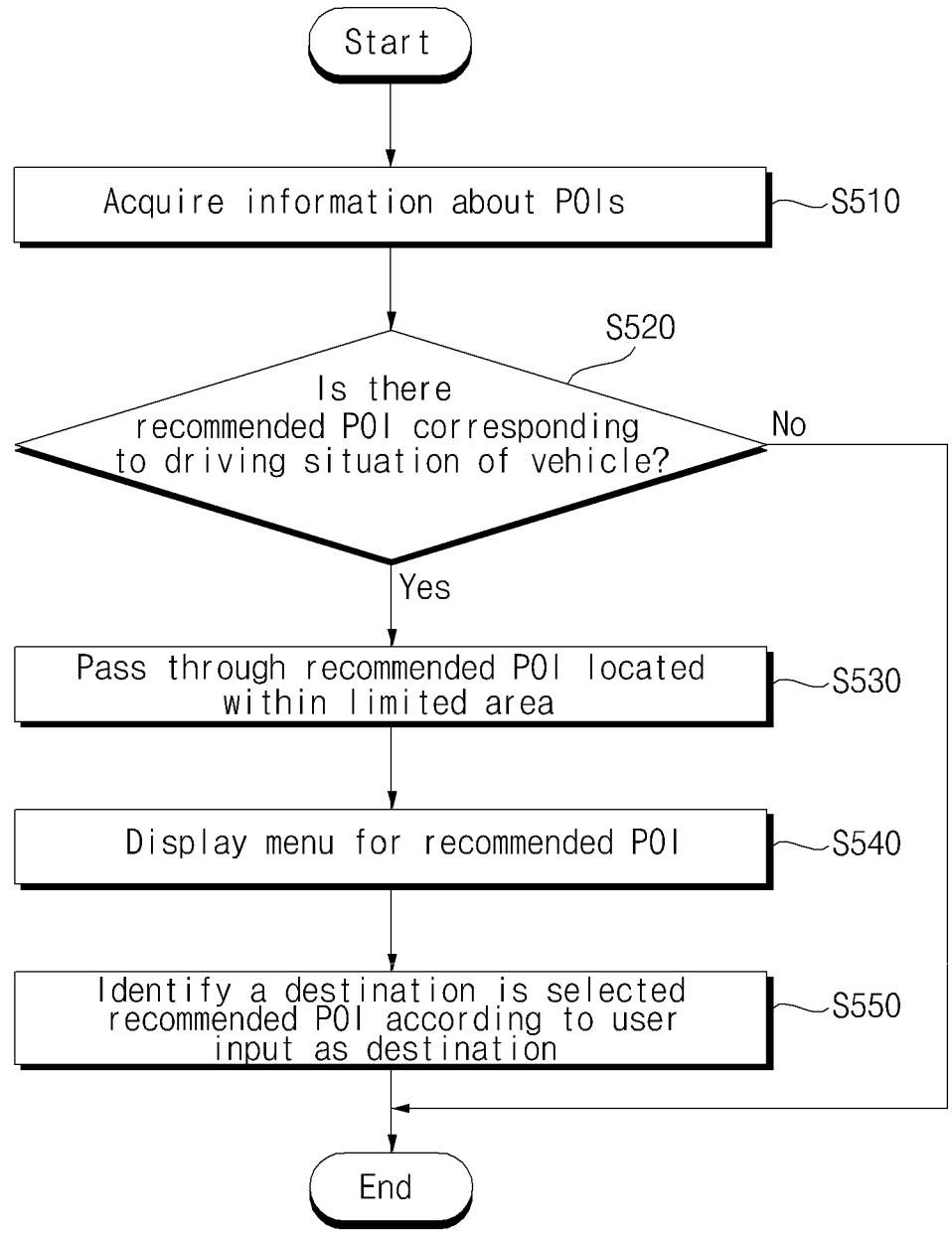
FIG. 13 is a flowchart of an example method for providing information about a recommended POI.

FIG. 13 is a flowchart of an example method for providing information about a recommended POI.

The processor 717 may acquire POI information through the interface 713 when the vehicle 100 autonomously travels within a set limited area (S510).

The POI information may include at least one of search history information or navigation information.

The search history information is information about web search performed through a mobile terminal or the user interface device 200. For example, the search history information may include information about searched places, persons who performed searches, search time, search positions, the number of times of searching per place, and the like.

when the user searches for a specific place using a mobile terminal, search history information may be stored in the memory of the mobile terminal. The processor 717 may acquire the search history information stored in the mobile terminal through the communication device 400.

When the user searches for a specific place through the interface device 200, the controller 170 may store the search history information in the memory 140. The processor 717 may acquire the search history information stored in the memory 140.

The processor 717 may determine one or more POIs on the basis of the search history information. In this case, POIs may be a place searched for one or more times by the user, a place directly set by the user as a POI, a place visited one or more times by the user, and a place related to an SNS notice of the user. In this case, a POI is a specific place determined to be preferred by the user.

The processor 717 may determine one or more POIs on the basis of navigation information. The navigation information may include information about a POI present on the web. For example, the POI present on the web may be a place searched for one or more times on the web or a place mentioned more than a predetermined number of times in web notices. The navigation system 770 may receive the information about the POI present on the web and include the information in the navigation information. In this case, the POI is a specific place determined to be preferred by unspecified individuals.

The processor 717 may determine whether there is a recommended POI corresponding to a driving situation of the vehicle on the basis of POI information and the first information (S520).

The processor 717 may determine, as a recommended POI, a POI corresponding to a vehicle driving situation determined on the basis of the first information among the one or more POIs determined on the basis of the POI information.

A vehicle driving situation may be information related to a vehicle, driving, a surrounding environment, a passenger, etc. determined by the processor 717 on the basis of the first information.

For example, the vehicle driving situation may be information about a current location of the vehicle, a vehicle state (e.g., the quantity of fuel, failure of a specific part, a speed, etc.), passengers (e.g., identification and the number of passengers), a passenger state (e.g., drowsy, emergency or emotion) and a driving time.

A case in which a POI corresponds to a vehicle driving situation refers to a case in which the type of place of the POI corresponds to the vehicle driving situation.

The type of place, for example, can represent a function or a characteristic of a place. For example, the type of a place may be a restaurant, a gas station, a school, a hospital, an office, a house, a shopping mall, a theater, a hotel, a historic site, a subway station, or the like. The processor 717 may determine the type of place of a specific POI on the basis of metadata included in the POI information.

The processor 717 may determine the type of place corresponding to a vehicle driving situation on the basis of a predetermined determination criterion. The predetermined determination criterion may be stored in a memory.

For example, the processor 717 may determine the type of place corresponding to a vehicle driving situation on the basis of at least one of the location of the vehicle, a state of the vehicle, a passenger, a passenger state or a driving time.

The processor 717 may determine one or more POIs corresponding to the type of place determined to correspond to the vehicle driving situation as recommended POIs.

The processor 717 may provide a control signal for controlling the vehicle to pass through a point located within a limited area from among the one or more recommended POIs (S530). Accordingly, the vehicle can pass through a recommended POI located within the limited area.

The processor 717 may display a menu for setting one of the one or more recommended POIs as a destination on the display 251 of the vehicle (S540).

The processor 717 may set a recommended POI selected on the basis of user input corresponding to a menu item as a destination (S550). The processor 717 may provide a control signal for controlling the vehicle to travel to the recommended POI set as a destination.

Figure 14:
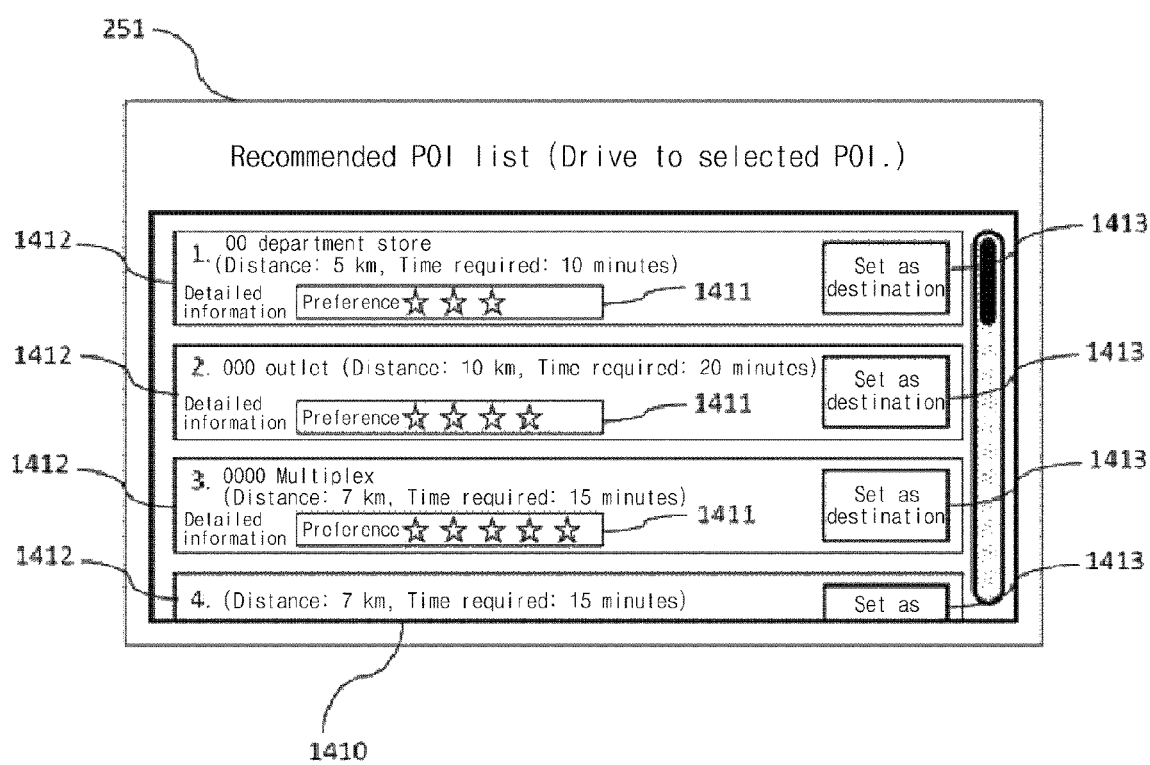
FIG. 14 is a diagram illustrating an example menu for displaying recommended POIs according to implementations of the present disclosure.

FIG. 14 illustrates an example menu for displaying recommended POIs according to implementations of the present disclosure.

The processor 717 may display a menu 1410 for recommended POIs on the display 251 upon determining that there are recommended POIs corresponding to a vehicle driving situation on the basis of POI information and the first information.

The processor 717 may display the menu 1410 for recommended POIs in a message box 1412 including text which indicates a recommended POI.

The processor 717 may display an image 1411 indicating user preference for each recommended POI in each message box 1412 including text which indicates each recommended POI.

For example, the image 1411 indicating user preference may be an image of one or more starts arranged in one direction.

The processor 717 may determine user preference for one or more recommended POIs on the basis of POI information.

The processor 717 may determine user preference according to the number of times that the user has searched for a specific POI, the number of times that the user has actually visited the POI, the number of times that the POI has been registered with SNS, whether the contact or location of the POI is stored, whether the POI is bookmarked, and a degree of interest directly input by the user, which are determined on the basis of the POI information.

For example, the processor 717 can determine that user preference for a specific POI is high when the number of times that the user has searched for the specific POI, the number of times that the user has actually visited the POI and the number of times that the POI has been registered with SNS are large.

For example, the processor 717 can determine that user preference for a specific POI is high when the contact or location of the specific POI is stored.

For example, the processor 717 can determine that user preference for a specific POI is high when the specific POI is bookmarked.

For example, the processor 717 can determine user preference for a specific POI on the basis of a degree of interest directly input by the user for the specific POI.

The processor 717 may calculate user preference for a specific POI as a specific score through overall determination of the aforementioned determination criteria. For example, the processor 717 can determine user preference for a specific POI as 86 out of 100.

The processor 717 may display a selection button 1413 for setting each recommended POI as a destination of the vehicle 100 in each message box 1412 including text which indicates each recommended POI.

Upon determining that user input applied to a specific selection button 1413 is received, the processor 717 may set a recommended POI corresponding to the selection button selected according to the user input as a destination of the vehicle 100.

Figure 15:
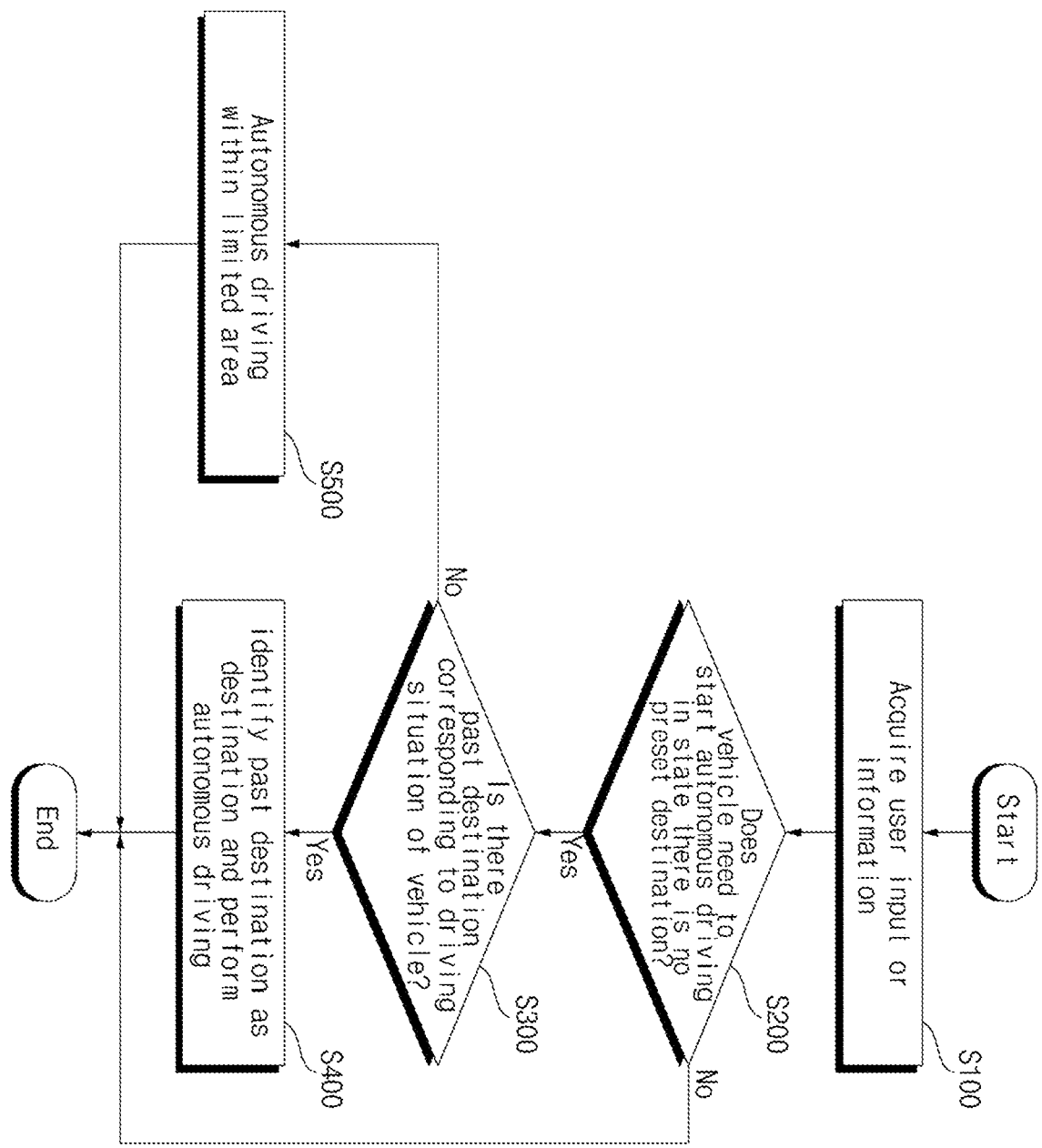
FIG. 15 is a flowchart of an example method for setting a destination based on past driving history.

FIG. 15 is a flowchart of an example method for setting a destination based on past driving history.

The processor 717 may acquire at least one of user input or the first information through the interface 713 (S100).

The processor 717 may determine whether the vehicle 100 needs to start autonomous driving while a destination has not been preset on the basis of user input or the first information (S200).

The processor 717 may determine whether the vehicle 100 needs to start autonomous driving while a destination has not been preset on the basis of user input.

For example, the processor 717 can determine whether there is a preset destination upon reception of user input for requesting autonomous driving of the vehicle.

The processor 717 may display the menu for setting a destination on the display 251 of the vehicle upon determining that there is no preset destination. The processor 717 may determine that the vehicle needs to start autonomous driving while a destination has not been preset when a destination is not input for a set period of time after the menu is displayed or user input for requesting autonomous driving is received again.

The processor 717 may determine whether the vehicle 100 needs to start autonomous driving in a state in which a destination has not been preset on the basis of the first information.

For example, the processor 717 can determine that the vehicle 100 needs to start autonomous driving in a state in which a destination has not been preset upon determining that the vehicle cannot stop, there is no preset destination and a passenger does not drive the vehicle on the basis of the first information.

Upon determining that the vehicle 100 needs to start autonomous driving in a state in which a destination has not been preset, the processor 717 may determine whether there is a past destination corresponding to a driving situation of the vehicle on the basis of driving history data and the first information (S300).

The driving history data is information indicating a history related to previous driving of a vehicle. For example, the driving history data can include information about previously set destinations, arrival locations of the vehicle, time related to past driving (e.g., start time, driving time, and arrival time), start points of the vehicle, information associated with passengers who was aboard the vehicle (e.g., number of passengers, identities of the passengers), past intermediate destinations of the vehicle, dwelling duration at the intermediate destinations of the vehicle, and past driving routes.

A past destination corresponding to a driving situation of the vehicle may be determined in various ways. For example, through comparison between the current driving situation of the vehicle 100 and various past driving situations, a place set as a destination of the vehicle in a past driving situation that most closely corresponds to the current driving situation of the vehicle 100 can be identified as such.

A place set as a destination of the vehicle 100 in a past driving situation may be called a past destination corresponding to the past driving situation.

In some implementations, the processor 717 may determine a matching rate between a vehicle driving situation determined on the basis of information provided by various units of the vehicle and each of the past driving situation in order to identify a past driving situation that most closely corresponds to the current driving situation.

In some implementations, the processor 717 may determine past destinations having matching rates equal to or greater than a set value from among one or more past driving situations as past destinations corresponding to the driving situation of the vehicle. The set value is a reference value for determining whether a past driving situation is similar to the current driving situation. The set value may be stored in the memory 140. The set value may be changed by the user. For example, the set value may be 80%. In this case, the processor 717 can determine as a recommended destination a destination corresponding to a past driving situation having a matching rate of 80% or higher with the current driving situation.

The processor 717 may determine a past destination corresponding to a maximum matching rate from among one or more past driving situations as a past destination corresponding to the driving situation of the vehicle.

The processor 717 may set a past destination corresponding to the driving situation of the vehicle as a destination of the vehicle 100 and control the vehicle 100 to autonomously travel to the set destination (S400).

The processor 717 may set a limited area and control the vehicle 100 to autonomously travel within the limited area upon determining that there is no past destination corresponding to the driving situation of the vehicle.

Figure 16:
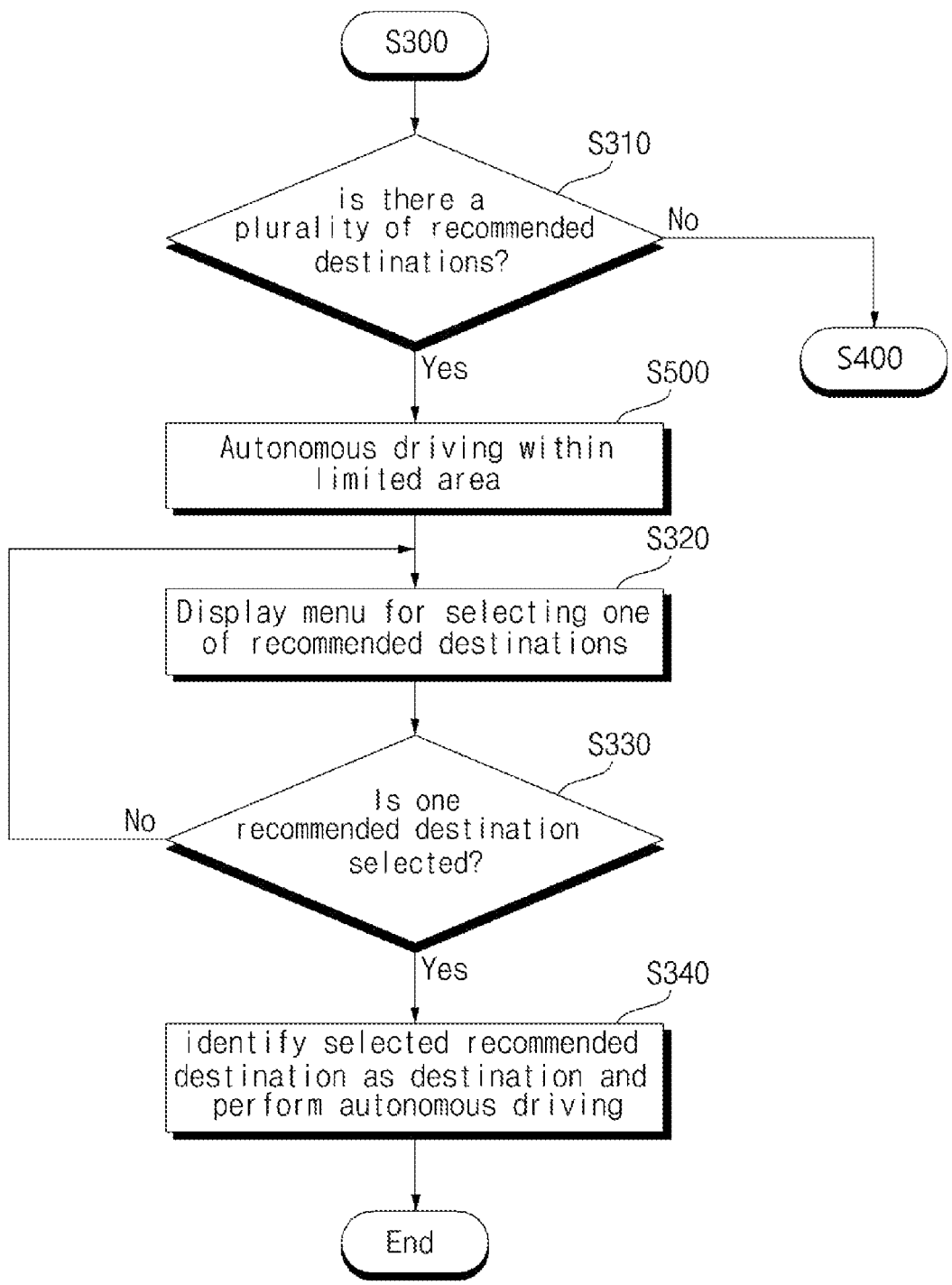
FIG. 16 is a flowchart of an example method for controlling a vehicle when there are multiple recommended destinations.

FIG. 16 is a flowchart of an example method for controlling a vehicle when there are multiple recommended destinations.

When recommended destinations corresponding to a driving situation of the vehicle are present, the processor 717 may determine whether there are multiple recommended destinations (S310).

When there is a single recommended destination, the processor 717 may set the recommended destination as a destination of the vehicle (S400). For example, the processor may determine that only a single destination has a matching rate that is greater than the reference value.

When there are multiple recommended destinations, the processor 717 may set a limited area and control the vehicle 100 to autonomously travel within the limited area (S500). In such a situation, the autonomous driving may be performed in various ways.

For example, the vehicle 100 is controlled to autonomously travel within the limited area while the user is reviewing the multiple recommended destinations to select one or more of the recommended destinations as a destination for the vehicle. As such the vehicle 100 can autonomously travel in a state in which a destination of the vehicle 100 is not set.

To such ends, the processor 717 may display a menu for selecting one of multiple recommended destinations on the display 251 of the vehicle (320).

The processor 717 may determine whether a recommended destination has been selected on the basis of user input corresponding to a menu item (S330). For example, user input corresponding to a menu item (e.g., pressing on a graphic object of the menu item on a touchscreen) is an input for selecting one of multiple recommended destinations.

When one recommended destination is selected on the basis of user input corresponding to a menu item, the processor 717 may set the selected recommended destination as a destination of the vehicle (S340). The processor 717 may provide a control signal to the vehicle drive device 600 to control the vehicle 100 to autonomously travel to the set destination (S340).

When there are multiple recommended destinations, the processor 717 may perform an autonomous driving of the vehicle within a limited area based on the multiple recommended destinations.

For example, an autonomous driving route with multiple destinations corresponding to the multiple recommended destinations may be generated. Based on such a route, the vehicle may autonomously drive to multiple recommended destinations. The order of the destinations of the autonomous driving route may be determined, for example, based on the matching rate, such that a recommended destination with the highest matching rate is visited first, followed by other recommended destinations with progressively lower matching rates. As another example, the multiple recommended destinations may be ordered to minimize total driving distance, time, or combination thereof. The final destination of the autonomous driving route may be a starting location of the autonomous driving route such that the vehicle returns to the starting location after visiting all of the recommended destinations.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a HDD (Hard Disc Drive), a SSD (Solid State Disc), SDD (Silicon Disc Drive), a ROM, a RAM, a CD-ROM, a magnetic tape, a floppy disk, optical data storage, and a carrier wave, e.g., data transmission over the Internet.

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A driving system for a vehicle, comprising:
   an interface configured to acquire vehicle driving information and to acquire information from one or more devices provided in the vehicle;
   at least one processor; and
   a computer-readable medium coupled to the at least one processor having stored thereon instructions which, when executed by the at least one processor, causes the at least one processor to perform operations comprising:
   acquiring, through the interface, at least one of (i) information from the one or more devices provided in the vehicle or (ii) a user input;
   based on at least one of (i) the acquired information from the one or more devices provided in the vehicle or (ii) the acquired user input, determining that the vehicle is to be autonomously driven in absence of a set destination;
   based on the determination that the vehicle is to be autonomously driven in absence of a set destination, determining a first time period based on the acquired information;
   identifying a first area based on the first time period;
   providing, through the interface, a control signal to a vehicle drive device, the control signal configured to autonomously drive the vehicle within the first area, receiving, through the interface, a signal from a maneuvering device of the vehicle;

based on the receipt of the signal from the maneuvering device, determining that the vehicle is located within a second distance from a boundary of the first area; and based on the (i) receipt of the signal from the maneuvering device, and (ii) determination that the vehicle is located within the second distance from the boundary of the first area, modifying the boundary of the first area, wherein the first time period is determined at least in part by a maximum time for the vehicle to return to a starting point of the autonomous driving in absence of a set destination.

2. The driving system according to claim 1, wherein determining that the vehicle is to be autonomously driven in absence of a set destination comprises:

receiving a first user input requesting autonomous driving of the vehicle;

based on receipt of the first user input requesting autonomous driving of the vehicle, displaying, through a display of the vehicle, a screen configured to receive an input of the destination of the vehicle;

determining that (i) the input of the destination has not been received after a predetermined period, or (ii) a second user input requesting autonomous driving of the vehicle has been received; and based on the determination that (i) the input of the destination has not been received after a predetermined period, or (ii) a second user input requesting autonomous driving of the vehicle has been received, determining that the vehicle is to be autonomously driven in absence of a set destination.

3. The driving system according to claim 1, wherein determining that the vehicle is to be autonomously driven in absence of a set destination comprises:

determining, based on the acquired information, that (i) the vehicle is in a driving scenario in which the vehicle is not allowed to stop, and (ii) a passenger is not manually driving the vehicle; and based on the determination that (i) the vehicle is in a driving scenario in which the vehicle is not allowed to stop, and (ii) the passenger is not manually driving the vehicle, determining that the vehicle is to be autonomously driven in absence of a set destination.

4. The driving system according to claim 1, wherein determining the first time period based on the acquired information comprises:

acquiring, through the interface, the information from the one or more devices provided in the vehicle by acquiring schedule information and vehicle position information; and determining the first time period based on the acquired schedule information and the vehicle position information, the first time period determined based at least in part on the vehicle driving to an appointment location by an appointment time indicated in the schedule information.

5. The driving system according to claim 1, wherein determining the first time period based on the acquired information comprises:

acquiring, through the interface, at least one of energy information or traffic information; and determining the first time period based at least on the at least one of the energy information or the traffic information.

6. The driving system according to claim 1, wherein identifying a first area based on the first time period comprises:

identifying the first area as an area, anywhere from which the vehicle can return to an autonomous driving starting location within the first time period.

7. The driving system according to claim 1, wherein the operations comprise:

in a state in which the vehicle is being autonomously driven in absence of a set destination, acquiring, through the interface, a destination input from a device provided in the vehicle; and based on the acquired destination input, setting the destination according to the acquired destination input.

8. A driving system for a vehicle, comprising:

an interface configured to acquire vehicle driving information and to acquire information from one or more devices provided in the vehicle;

at least one processor; and a computer-readable medium coupled to the at least one processor having stored thereon instructions which, when executed by the at least one processor, causes the at least one processor to perform operations comprising:

acquiring, through the interface, at least one of (i) information from the one or more devices provided in the vehicle or (ii) a user input;

based on at least one of (i) the acquired information from the one or more devices provided in the vehicle or (ii) the acquired user input, determining that the vehicle is to be autonomously driven in absence of a set destination;

based on the determination that the vehicle is to be autonomously driven in absence of a set destination, determining a first time period based on the acquired information;

identifying a first area based on the first time period;

acquiring, through the interface, points of interest (POIs) information;

determining, based on the POIs information and the vehicle driving information, one or more recommended POIs corresponding to a driving situation of the vehicle and located within the first area, providing, through the interface, a control signal to a vehicle drive device, the control signal configured to autonomously drive the vehicle within the first area, wherein providing the control signal to the vehicle drive device comprises:

providing a control signal configured to autonomously drive the vehicle through the one or more recommended POIs located within the first area;

determining that (i) the vehicle has passed through the one or more recommended POIs located within the first area and (ii) the user has not entered a destination, and based on the determination that (i) the vehicle has passed through the one or more recommended POIs located within the first area and (ii) the user has not entered a destination, providing a control signal configured to autonomously drive the vehicle to a preset return location.

9. The driving system according to claim 8, wherein the operations comprise:

displaying, through a display of the vehicle, a screen configured to receive a user selection among the one or more recommended POIs; and setting the destination of the vehicle according to the received user selection.

10. The driving system according to claim 8, wherein the operations comprise:
determining a presence of a plurality of recommended POIs located within the first area; and
based on the determination of the presence of a plurality of recommended POIs located within the first area, generating an optimized path through the plurality of recommended POIs, and
wherein providing the control signal to the vehicle drive device comprises:
providing a control signal configured to autonomously drive the vehicle through the optimized path.

11. The driving system according to claim 8, wherein the operations comprise:
determining user preference for the one or more recommended POIs based on the POIs information; and
displaying, through a display of the vehicle, the user preference for the one or more recommended POIs.

* * * * *